(12) United States Patent
Kogo et al.

(10) Patent No.: US 7,476,154 B2
(45) Date of Patent: Jan. 13, 2009

(54) CYLINDRICAL ILLUMINATION DEVICE AND GAME MACHINE USING THE SAME

(75) Inventors: Junichi Kogo, Tokyo (JP); Jun Hirato, Tokyo (JP); Masato Ishikawa, Tokyo (JP); Yasuaki Tanabe, Tokyo (JP)

(73) Assignee: Aruze Corp., Koto-ku, Tokyo (JP)

( * ) Notice: Subject to any disclaimer, the term of this patent is extended or adjusted under 35 U.S.C. 154(b) by 171 days.

(21) Appl. No.: 11/354,260

(22) Filed: Feb. 15, 2006

(65) Prior Publication Data

US 2006/0205498 A1 Sep. 14, 2006

(30) Foreign Application Priority Data

| Feb. 17, 2005 | (JP) | ............................. 2005-040833 |
| Feb. 17, 2005 | (JP) | ............................. 2005-040874 |
| Feb. 17, 2005 | (JP) | ............................. 2005-040912 |

(51) Int. Cl.
   *A63F 9/00* (2006.01)
   *G09B 13/00* (2006.01)

(52) U.S. Cl. .............................. 463/30; 434/28; 434/29; 434/30; 434/31; 434/32; 434/33; 434/227

(58) Field of Classification Search .................. 463/30; 434/28–33, 227
   See application file for complete search history.

(56) References Cited

U.S. PATENT DOCUMENTS

| 6,634,886 | B2 * | 10/2003 | Oyama et al. ................ 434/227 |
| 6,682,418 | B1 * | 1/2004 | Mendes et al. ................. 463/6 |
| 2001/0014440 | A1 * | 8/2001 | Oyama et al. ................ 434/227 |
| 2002/0018983 | A1 * | 2/2002 | Dixon ........................ 434/227 |
| 2004/0053663 | A1 * | 3/2004 | Paulsen et al. ................ 463/16 |
| 2006/0183092 | A1 * | 8/2006 | Kogo ........................ 434/227 |
| 2006/0183093 | A1 * | 8/2006 | Kogo ........................ 434/227 |
| 2006/0188855 | A1 * | 8/2006 | Okada et al. ................ 434/227 |
| 2006/0188856 | A1 * | 8/2006 | Kogo ........................ 434/227 |
| 2006/0199156 | A1 * | 9/2006 | Kogo ........................ 434/227 |
| 2006/0204941 | A1 * | 9/2006 | Kogo ..................... 434/307 A |
| 2006/0257831 | A1 * | 11/2006 | Okada ........................ 434/227 |
| 2006/0293101 | A1 * | 12/2006 | Kogo ........................ 463/35 |

FOREIGN PATENT DOCUMENTS

| JP | 2001-198353 | 7/2001 |
| JP | 2001-272934 | 10/2001 |
| JP | 2002-055635 | 2/2002 |
| JP | 2002-202739 | 7/2002 |
| JP | 11-244529 | 1/2005 |
| JP | 2005-10263 | 1/2005 |

* cited by examiner

*Primary Examiner*—Robert E Pezzuto
*Assistant Examiner*—Seng Heng Lim
(74) *Attorney, Agent, or Firm*—McGinn IP Law Group, PLLC

(57) ABSTRACT

A illumination device comprises a transparent member in which a lenticular lens of a cylindrical shape is disposed in a longitudinal direction; and light emitting members disposed in a vertical direction at prescribed intervals inside the transparent member; in which a visual illusion of existence of light emitting rings, respectively arrayed in a horizontal direction and respectively disposed in a vertical direction inside the transparent member, is created by light emitted from the various light emitting members.

21 Claims, 27 Drawing Sheets

| Number of times points have been continuously increased | Number of points rings | Color of points ring |
|---|---|---|
| 1 | 1 | red |
| 2 | 2 | blue |
| 3 | 3 | yellow |
| ⋮ | ⋮ | ⋮ |

CYLINDRICAL ILLUMINATION DEVICE AND GAME MACHINE USING THE SAME

This application is based on and claims the benefit of priority from Japanese Patent Application Nos. 2005-040833, No. 2005-040874, and No. 2005-040912, filed on 17 Feb. 2005, the content of which is incorporated herein by reference.

BACKGROUND OF THE INVENTION

1. Field of the Invention

The present invention relates to a cylindrical illumination device and a game machine that performs control of light emission using the device.

2. Related Art

Conventionally, a cylindrical illumination device, as described in Japanese Patent Application Publication No. 2001-272934, for example, is a device formed of a light source, a lenticular lens having a cylindrical shape with the light source as center, and a light transmission controller, the device being configured so that a display image can be seen from any direction through 360 degrees, and furthermore, different images can be seen according to viewing angle.

Furthermore, Japanese Patent Application Publication No. 2002-55635 mentioned below, describes a configuration for a flashing light in which a transparent prismatic reflective sheet and light emitting elements such as LEDs are arrayed on a reflector attached to an upper portion of a support mounting, inside a plastic cylindrical member, and in order to improve visibility of signs for road works, a large display surface can be provided on which the flashing light extends over the full width of the display surface of the signs.

In addition, Japanese Patent Application Publication No. 2002-202739 mentioned below, an illumination device is described in which a LED light source is disposed at an open end of a transparent or semitransparent cylindrical light transmitting member, light generated in an axial direction of the light transmitting member is diffusely reflected by a transparent or semitransparent member with protrusions, in which the protrusions are formed in a band on an inner peripheral face of the light transmitting member, and an illuminating lamp is used to illuminate a light-extracting face of the transmitting member, a reflecting member being disposed on the rear side of the illuminating lamp, and in the illumination device the light diffusely reflected by the member with the protrusions is further intensified by the reflecting member.

Furthermore, Japanese Patent Application Publication No. 2005-10263 mentioned below, describes an inner cylinder in which an embossed hologram sheet is formed as a circular or a polygonal cylinder, and an outer cylinder in which a lenticular lens is formed as a circular or a polygonal cylinder, the inner cylinder being housed in the outer cylinder, with a display on which light from one end or both ends of the outer cylinder is incident, and by this type of configuration, the device realizes an improvement in color effects (glittering sensation).

On the other hand, in conventional game machines that perform control of light emission, for example, as described in Japanese Patent Application Publication No. H11-244529, mentioned below, a game apparatus has a display-device for displaying game contents as an image, and a display board for displaying game related information concerning a game; the game apparatus includes a CCD camera for filming a player, and a fluorescent light disposed on the rear side of the display board, as viewed by the player; the display board is formed of a transparent member, game related information is written on its front face, and in addition, with the fluorescent light illuminating both the display board and the player, the illuminated player is filmed by the CCD camera to give a clear image. Accordingly, since a dedicated illumination device for illuminating the player need not be provided, the outer form of the game apparatus is not large in size and the cost is not high.

Furthermore, Japanese Patent Application Publication No. 2001-198353 mentioned below, describes a music game machine in which a pair of turntables and a fader switch are arranged on an upper face of an operations box; with this music game machine, after selecting a song to be performed, a player watches a guidance image displayed on a display area and performs a slide operation of the fader switch, as well as manually operating a turntable to perform a scratch operation. In addition, spotlights are installed on the left and right side faces of the display area, and these spotlights are mounted so that the radiation direction of light of each of the spotlights can be adjusted, with angles adjusted so as to radiate light onto the turntables. Moreover, the spotlights do not continuously radiate light; when it is required to perform a scratch operation on an imitation record placed on the turntable, light is radiated intermittently onto the imitation record that is to be operated.

SUMMARY OF THE INVENTION

However, objects of these cylindrical illumination devices are, respectively, to be abler to clearly see an image from any angle, to provide a large sized display screen that is lightweight and bright, to illuminate a wide illumination area with high brilliance, and to enable improvement of color effects (glittering sensation), but not to make a presentation using light from a light source, a light emitting element, or an illuminating lamp.

Therefore, in view of the abovementioned points, the present invention has as an object the provision of a cylindrical illumination device in which a new illumination presentation is performed.

Furthermore, game machines that perform control of light emission have as an object illuminating and irradiating a player positioned in front of the machine and an imitation record required for game operation, and the provision of a bright environment for the player, but not of attracting, by illuminating and irradiating surroundings thereof, the attention of people other than the player, nearby and in the surroundings.

Consequently, in view of the abovementioned points, the present invention has as an object the provision of a game machine in which an illumination presentation is performed for communicating a state of a game to people in the surroundings including other players playing on both adjacent sides.

In order to solve these problems related to the cylindrical illumination device, according to a first aspect of the present invention, the cylindrical illumination device (for example, the illumination device 7) includes a transparent member (for example, the transparent member 223) in which a lenticular lens of cylindrical shape is disposed in a longitudinal direction, and light emitting members (for example, full color LEDs 222) disposed in a vertical direction at prescribed intervals inside the transparent member (for example, the transparent member 223), and a visual illusion of the existence of light emitting rings, respectively arrayed in a horizontal direction and respectively disposed in a vertical direction inside the transparent member (for example, the transparent member 223), is created by light emitted from the various light emitting members (for example, the full color LEDs 222).

Furthermore, in a second aspect of the present invention as described in the first aspect, the cylindrical illumination device (for example, the illumination device 7) includes an optical shield (for example, the optical shield 221) for blocking light from the various light emitting members (for example, the full color LEDs 222) by being placed inside the transparent member (for example, the transparent member 223), and by an area radiated by light from the plurality of light emitting members (for example, the full color LEDs 222) on an inner face of the transparent member (for example, the transparent member 223) being restricted by the optical shield (for example, the optical shield 221), the light that is emitted from the plurality of light emitting members (for example, the full color LEDs 222), after passing through the transparent member (for example, the transparent member 223), is prevented from returning again inside the transparent member (for example, the transparent member 223).

DETAILED DESCRIPTION OF THE INVENTION

Moreover, in order to solve the problems of the game machine, in a third aspect of the present invention, the game machine (for example, the typing game machine 1) has a cabinet (for example, the cabinet 2), and cylindrical illumination devices (for example, the cylindrical illumination devices 7) arranged one on either side of the cabinet (for example, the cabinet 2), and the cylindrical illumination devices (for example, the illumination devices 7), create a visual illusion, by the light emitting members (for example, the full color LEDs 222), with light emitted from the light emitting members (for example, the full color LEDs 222), of the existence of light emitting rings, and furthermore, is provided with a light emission controller (for example, a CPU 51, an illumination control circuit 62) for determining a light emission mode of the light emitting members (for example, the full color LEDs 222), in accordance with a game state.

Furthermore, a cross-section of the light emitting rings may, for example, have a circular shape, or may have a polygonal shape.

Moreover, in a fourth aspect of the present invention as described in the third aspect, in the game machine (for example, the typing game machine 1), the cylindrical illumination device (for example, the illumination device 7) includes the transparent member (for example, the transparent member 223) in which the lenticular lens of cylindrical shape is arranged in a longitudinal direction, and the light emitting members (for example, the full color LEDs 222) are disposed in a vertical direction at prescribed intervals inside the transparent member (for example, the transparent member 223), and a visual illusion of the existence of light emitting rings, respectively arrayed in a horizontal direction and respectively disposed in a vertical direction inside the transparent member (for example, the transparent member 223), is created by light emitted from the plurality of light emitting members (for example, the full color LEDs 222).

In addition, in a fifth aspect of the present invention as described in the fourth aspect, in the game machine (for example, the typing game machine 1), the cylindrical illumination device (for example, the illumination device 7) includes the optical shield (for example, the optical shield 221) for blocking light from the plurality of light emitting members (for example, the full color LEDs 222) by being placed inside the transparent member (for example, the transparent member 223), and, by the optical shield (for example, the optical shield 221) restricting the area radiated by the light from the plurality of light emitting members (for example, the full color LEDs 222) on an inner face of the transparent member (for example, the transparent member 223), the light that is emitted from the plurality of light emitting members (for example, the full color LEDs 222), after passing through the transparent member (for example, the transparent member 223), is prevented from returning again inside the transparent member (for example, the transparent member 223).

Furthermore, in a sixth aspect of the present invention as described in the third aspect, the light emission controller (for example, the CPU 51, the illumination control circuit 62) includes a first light emission controller (for example, the CPU 51, steps S101, S112, S113) that selects one or a plurality of the light emitting members (for example, the full color LEDs 222) according to a current game state, and makes the light emitting members (for example, the full color LEDs 222) emit light in a first light emitting mode in which a light emission position is fixed, a second light emission controller (for example, the CPU 51, steps S123, S124) that when the current game state fulfills a prescribed condition, makes the light emitting members (for example, the full color LEDs 222) emit light in a second light emitting mode in which the light emission position moves, and a third light emission controller (for example, the CPU 51, step S126) that, when the light emitting members (for example, the full color LEDs 222), while emitting light according to the first light emission controller (for example, the CPU 51, steps S101, S112, S113), become light emission objects of the second light emission controller (for example, the CPU 51, steps S123, S124), flashes one or a plurality of the light emitting members (for example, the full color LEDs 222).

In addition, in a seventh aspect of the present invention as described in the sixth aspect, in the game machine (for example, the typing game machine 1), the cylindrical illumination device (for example, the illumination device 7) includes the transparent member (for example, the transparent member 223) in which the lenticular lens of cylindrical shape is arranged in a longitudinal direction, and the light emitting members (for example, the full color LEDs 222) disposed in a vertical direction at prescribed intervals inside the transparent member (for example, the transparent member 223), and a visual illusion of the existence of light emitting rings (for example, a score ring 241, a points ring 242), respectively arrayed in a horizontal direction and respectively disposed in a vertical direction inside the transparent member (for example, the transparent member 223), is created by light emitted from the plurality of light emitting members (for example, the full color LEDs 222).

In addition, in an eighth aspect of the present invention as described in the seventh aspect, in the game machine (for example, the typing game machine 1), the cylindrical illumination device (for example, the illumination device 7) includes the optical shield (for example, the optical shield 221) for blocking light from the plurality of light emitting members (for example, the full color)LEDs 222) by being placed inside the transparent member (for example, the transparent member 223), and, by the optical shield (for example, the optical shield 221) restricting the area radiated by the light from the plurality of light emitting members (for example, the full color LEDs 222) on the inner face of the transparent member (for example, the transparent member 223), the light that is emitted from the plurality of light emitting members (for example, the full color LEDs 222), after passing through the transparent member (for example, the transparent member 223), is prevented from returning again to inside the transparent member (for example, the transparent member 223).

That is, in the cylindrical illumination device of the present invention, by the positional relationship of the cylindrical transparent member that is the lenticular lens, and the plurality of light emitting members inside the transparent member, when the light is emitted by the plurality of light emitting members, the visual illusion of the existence of the light emitting rings, respectively arrayed in a horizontal direction and respectively disposed in a vertical direction inside the cylindrical transparent member, can be created, and since a presentation in stages, by the light emitting rings, is possible, a new illumination presentation can be performed.

Furthermore, in the game machine according to the present invention, in the cylindrical illumination devices, provided on the two sides of the cabinet, when light is emitted from the plurality of light emitting members, due to the positional relationship of the cylindrical transparent member that is the lenticular lens, and the plurality of light emitting members inside the transparent member, since the visual illusion of the existence of the light emitting rings inside the cylindrical transparent member can be created, the light is emitted in the first light emission mode in which the light emission position of the one or the plurality of the light emitting members, selected according to the current game state, are fixed, and in addition, the light is emitted from the light emitting members in the second light emission mode in which the light emission position moves when the current game state fulfills a prescribed condition, and furthermore, if the one or the plurality of light emitting members are made to flash when the light emitting members that are emitting light in the first light emission mode become light emission objects of the second light emission mode, the presentation in stages can be performed, in the cylindrical illumination devices, by the light emitting rings in accordance with the current game state, including whether or not the prescribed condition is fulfilled, so that it is possible to perform the illumination presentation for communicating to people in the surroundings including other players playing on both adjacent sides, the current game state and the fact that the prescribed condition is fulfilled.

DETAILED DESCRIPTION OF PREFERRED EMBODIMENTS OF THE INVENTION

Below, an illumination device related to the present invention and a typing game machine using the device are explained in detail, referring to the figures, according to a specific embodiment of a cabinet-type typing game that is installed in a game center or the like. Here, the typing game machine, in which illumination devices related to the present embodiment are provided, is configured so that music is reproduced from a speaker, and in addition, a game is performed by sequentially displaying lyrics on a display-device in accompaniment with the music that is being played, and a player types the displayed lyrics sequentially on a keyboard. A further typing game that may be implemented is formed of stages corresponding to the number of songs in the reproduced music, and the typing game is configured so that, at the point in time when one stage is finished, if the number of typing mistakes by the player is within a prescribed number, play progresses to a stage corresponding to the next song, and continues.

Figure 1:
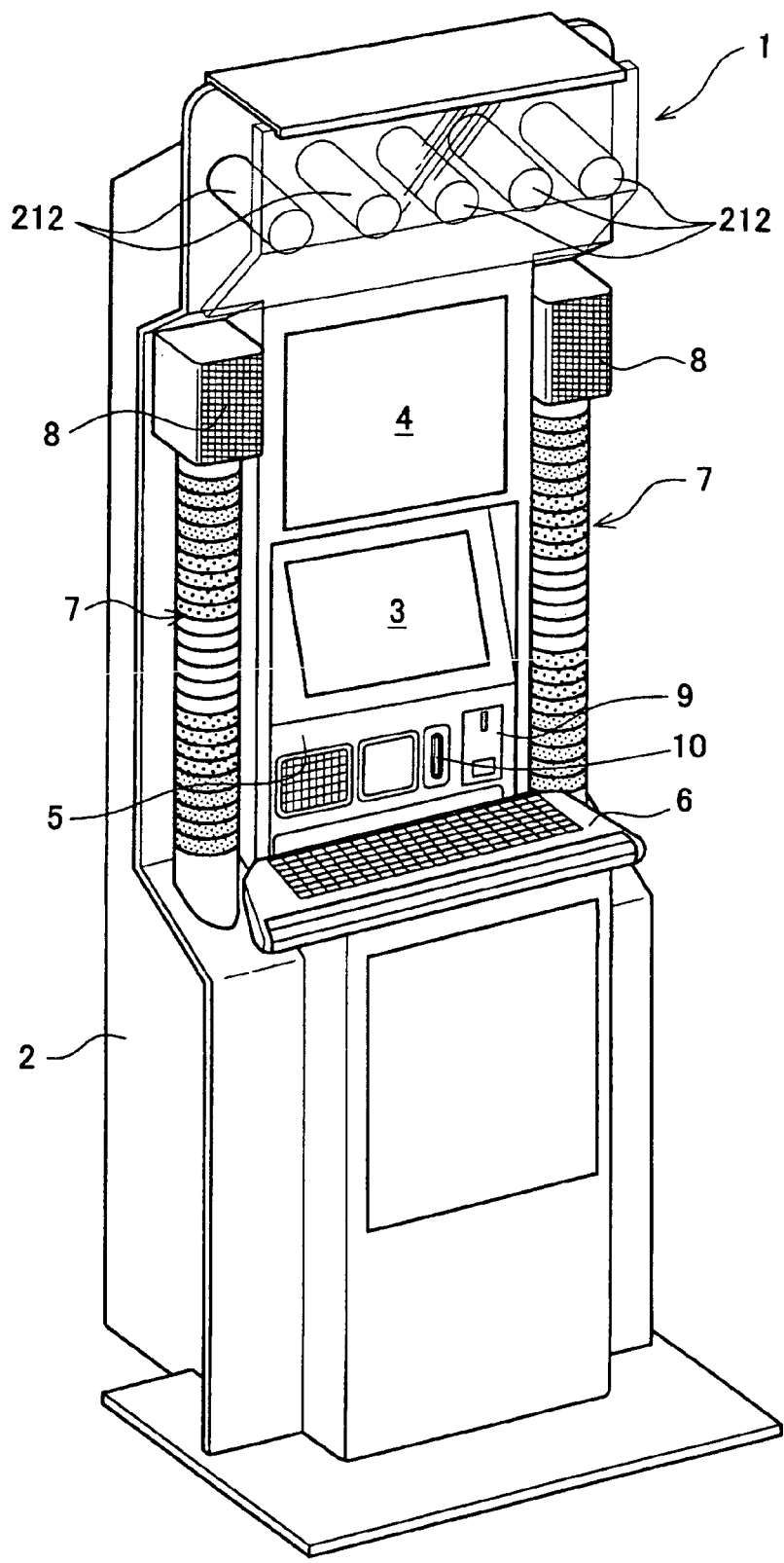
FIG. 1 is a perspective view of illumination devices related to an embodiment and a typing game machine using the devices.

First, a general configuration of the illumination devices related to the present embodiment and the typing game machine that uses the devices are explained according to FIG. 1. FIG. 1 is a perspective view of the illumination devices related to the present embodiment and the typing game machine that uses the devices.

As shown in FIG. 1, the typing game machine 1 that is provide with and that uses the illumination devices related to the present embodiment is basically configured from a cabinet 2 that makes up the external form of the typing game machine 1, a first liquid crystal display-device 3 in which a main game screen (see FIGS. 3B and 4B) is displayed, a second liquid crystal display-device 4 positioned above the first liquid crystal display-device 3, for displaying an image (see FIGS. 3A and 4A) related to a presentation such as a promotional video, an advertisement, or the like, a center panel 5 arranged below the first liquid crystal display-device 3 and in which insertion slots for a coin or a card are formed, a keyboard 6 on which a player types, a pair of illumination devices 7 arranged on the two edges of the front face of the cabinet 2, a pair of speakers 8 located on the left and right sides of the second liquid crystal display-device 4, five spotlights 212 located above the second liquid crystal display-device 4, and the like. Below, each constituent element is explained.

The first liquid crystal display-device 3 is a liquid crystal display-device disposed at a prescribed angular inclination at an approximately central region of the front face of the cabinet 2, and is disposed inclined at a prescribed angle to the rear.

Figure 3A:
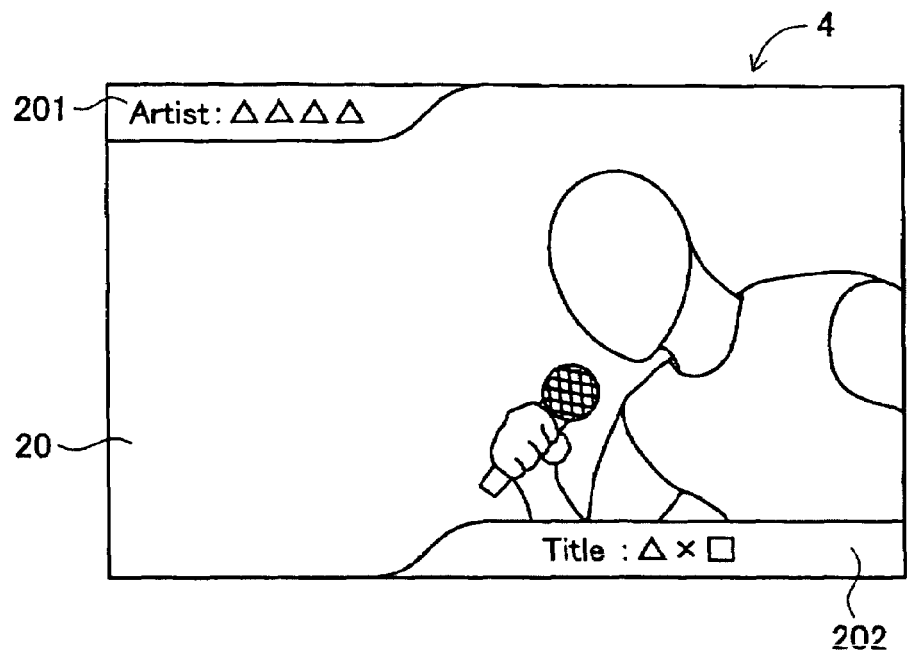
FIG. 3A is a schematic diagram showing display contents displayed on a second liquid crystal display-device during the typing game.
Figure 3B:
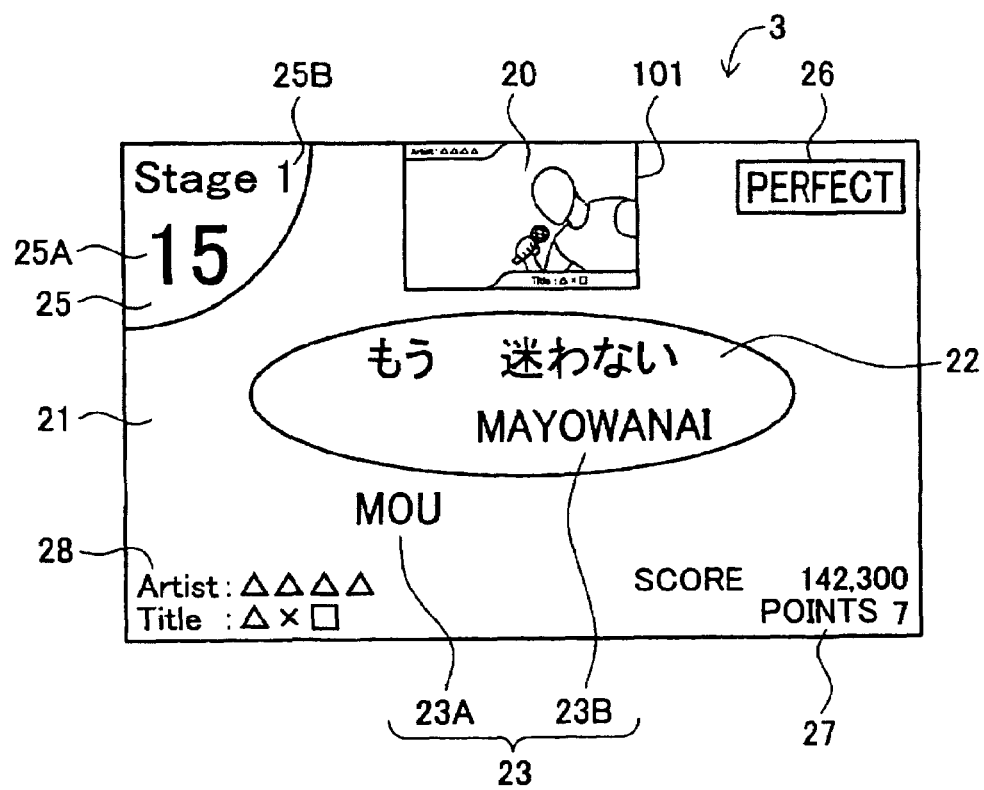
FIG. 3B is a schematic diagram showing display contents displayed on the first liquid crystal display-device during the typing game.
Figure 4A:
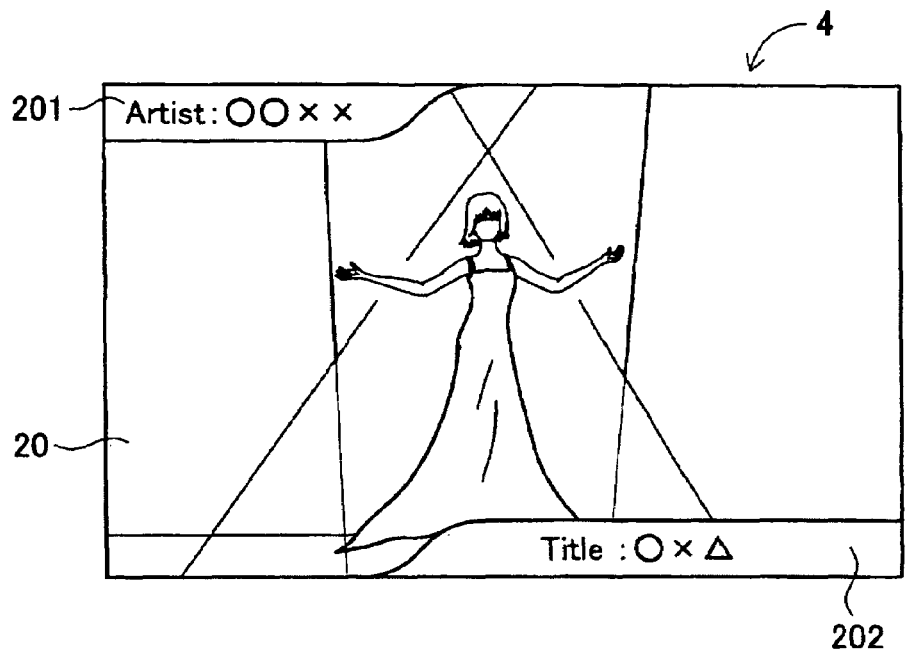
FIG. 4A is a schematic diagram showing display contents displayed on the second liquid crystal display-device during the typing game.
Figure 4B:
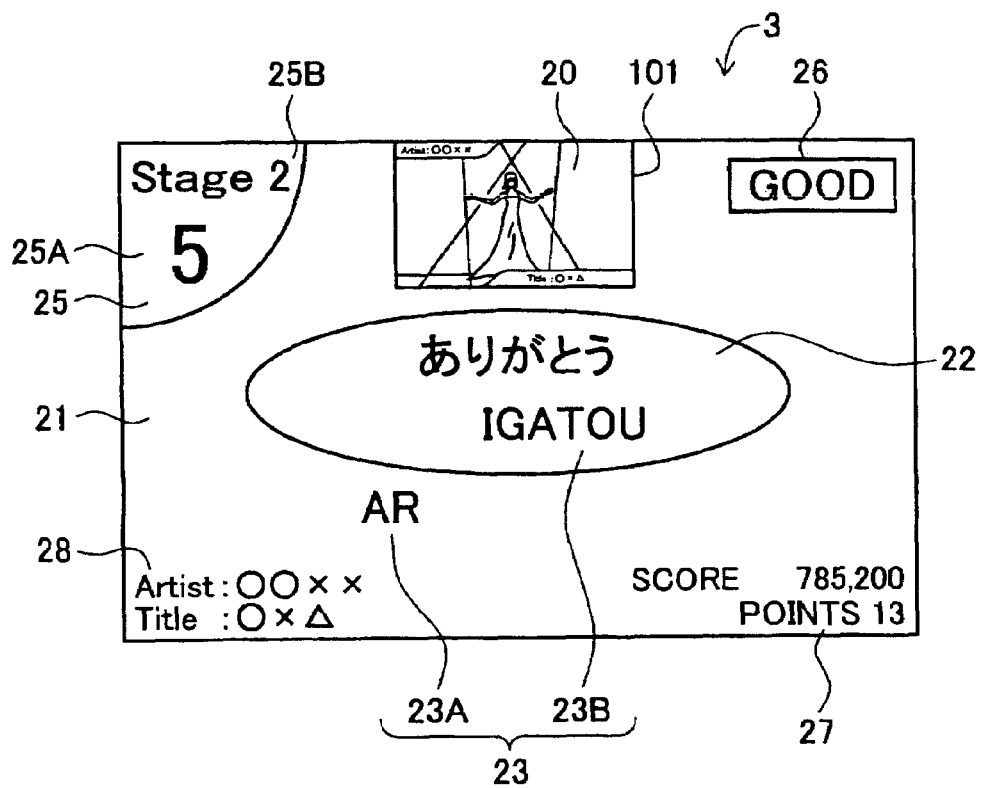
FIG. 4B is a schematic diagram showing display contents displayed on the first liquid crystal display-device during the typing game.

On the first liquid crystal display-device 3, the lyrics of the music reproduced via the speakers 8 when a typing game is played, typing results for the player, and game information (necessary information for the player to progress with the game) related to progress of this typing game, such as the points obtained in the game, and the like, are displayed (see FIGS. 3B and 4B).

In addition, the second liquid crystal display-device 4 separately disposed above the first liquid crystal display-device 3 is a liquid crystal display-device similar to the first liquid crystal display-device 3, but the second liquid crystal display-device 4 displays a presentation image related to a typing game presentation when the typing game is played.

Here, the presentation image displayed on the second liquid crystal display-device 4 differs from the display contents displayed mainly on the abovementioned first liquid crystal display-device 3, and not being directly necessary for the player to progress with the game, has an auxiliary role to make the typing game exciting. For example, in the typing game machine 1 that is provided with and that uses the illumination devices 7 related to the present embodiment, a certain singer's music is reproduced as the music, the player inputs the lyrics of the music via the keyboard 6 to progress with the game, and a promotional video (abbreviated to PV, below) related to the music is displayed on the second liquid crystal display-device 4 (see FIGS. 3A and 4A). Accordingly, the typing game can have a realistic feel, in which the form of a singing artist is displayed together with a performance of the music, and the player does not lose interest. Furthermore, display contents displayed on the first liquid crystal display-device 3 and the second liquid crystal display-device 4 are explained in detail below.

In addition, the coin insertion slot 9 and the card insertion slot 10 are provided on the center panel 5. The coin insertion slot 9 is a slot into which a hundred-yen coin, or the like, is inserted. A coin sensor 63 is disposed in the coin insertion slot 9, and when a coin is inserted in the coin insertion slot 9, a coin detection signal is output via the coin sensor 63 to a CPU 51 (see FIG. 9), and the CPU 51 detects that a coin has been inserted.

Furthermore, the card insertion slot 10 is an insertion slot into which is inserted an IC card (not shown in the figure) with a built-in IC tag on which a game result of the typing game is recorded. Inside this card insertion slot 10, a card reader/writer 65 and card sensor 64, described below, are disposed (see FIG. 9), and in cases in which the IC card is inserted into the card insertion slot 10, this fact is detected by the card sensor 64. Here, the IC card, used in the typing game machine 1 that is provided with and that uses the illumination devices 7 related to the present embodiment, stores game results (obtained score, points, and the like) for games up to the previous time for a player owning the card, on the built-in IC tag, and the game results stored thereon may be displayed to the player by performing a prescribed operation.

Figure 11:
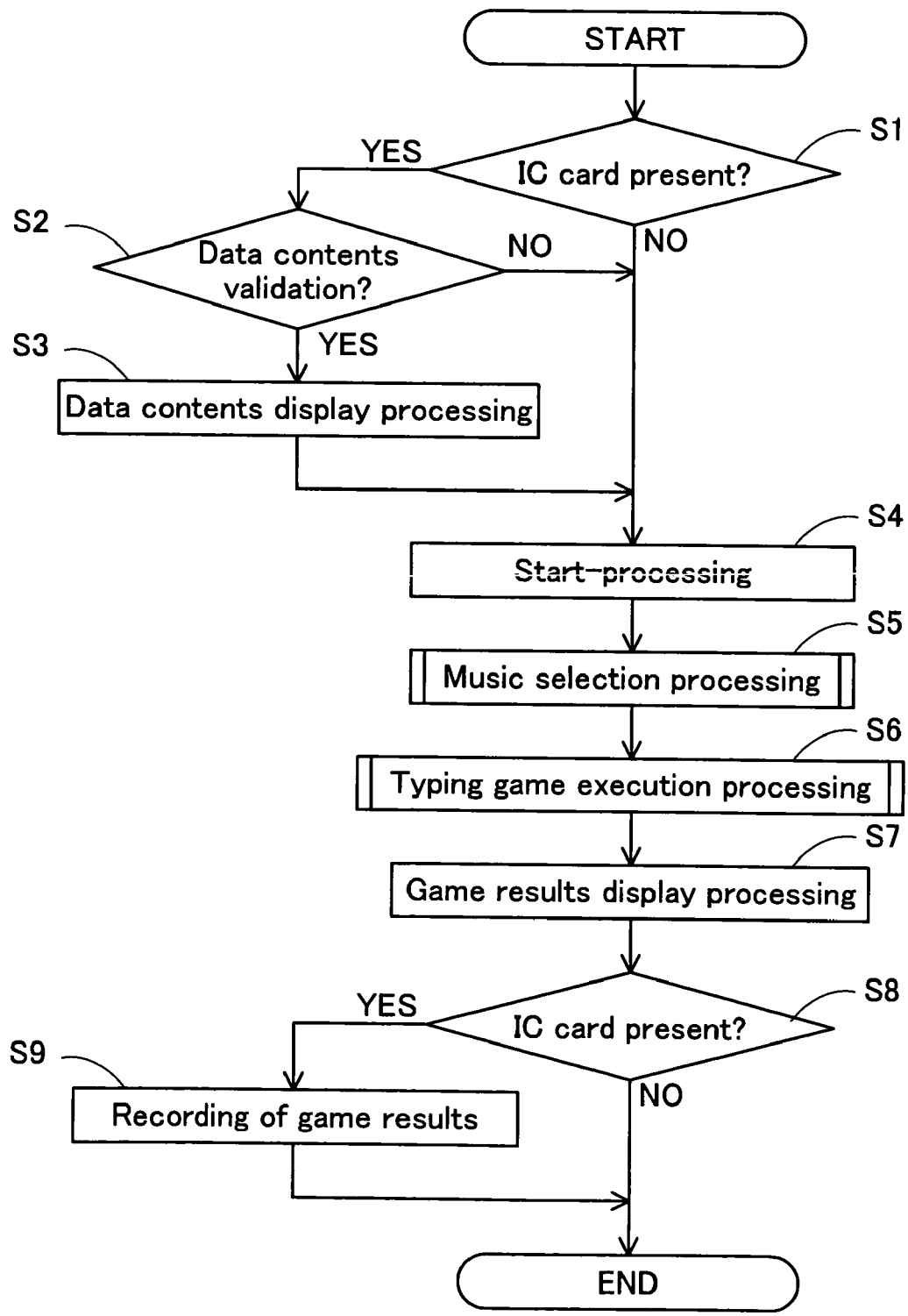
FIG. 11 is a flowchart for a main program of the typing game machine that is provided with and that uses the illumination devices related to the present embodiment.

That is, in cases in which the IC card is detected by the card sensor 64, the card reader/writer 65 reads the game results of the typing game from the IC tag, or writes new game results to the IC tag (steps S3 and S9 in FIG. 11).

Furthermore, the keyboard 6 is disposed protruding outwards from the front face of the cabinet 2, and, as described below, is a 108-key Japanese keyboard on which character input keys for performing input of Roman letters (A-Z), Japanese characters, numbers 0-9, symbols (period, comma), and the like, and function keys such as an enter key, cursor keys and the like, are respectively arrayed (see FIG. 6). In a game, the player performs character input by typing on plurality of keys corresponding to characters, symbols, numbers, and the like, and progresses with the game, issuing commands by operation of plurality of keys to select a song for performing the game and degree of game difficulty, before starting a game, after completing a game, or similar situations, and to start playing the game and the like. Furthermore, the configuration of the keyboard is explained in detail below.

Moreover, a pair of illumination devices 7 is disposed on the two edges of the front face of the cabinet 2. The external appearance of each illumination device 7 is formed of a cylindrical transparent member in which light emitting ring shapes (referred to as "light emitting rings" below) laid in a horizontal direction can be displayed in a state in which they are stacked one above the other, in a vertical direction, up to a maximum of twenty-four; furthermore, inside each illumination device 7, twenty-four full color LEDs that can be illuminated in full color are laid out, in a vertical direction, at equal intervals, and a varied illumination presentation is performed according to the music being reproduced in the typing game machine 1, or an illumination presentation is performed according to the typing progress of the player. For example, as an illumination presentation, a presentation in which the position or illumination color of the light emitting rings is varied, a presentation in which variations of the position or illumination color of the light emitting rings are performed according to a given rule, or a presentation by illuminating and extinguishing the light emitting rings, is possible. Moreover, the illumination presentation and the configuration of the illumination devices 7 are explained in detail below.

Furthermore, the speakers 8 are disposed on the two sides, left and right, of the second liquid crystal display-device 4. The speakers 8 are output devices for outputting music, sound effects, and the like, reproduced in the typing game machine 1. Specifically, when the typing game is played, the music and sound are output at a prescribed tempo, based on performance data and sound data of the music, stored in the HDD 55 (see FIG. 9).

Figure 2:
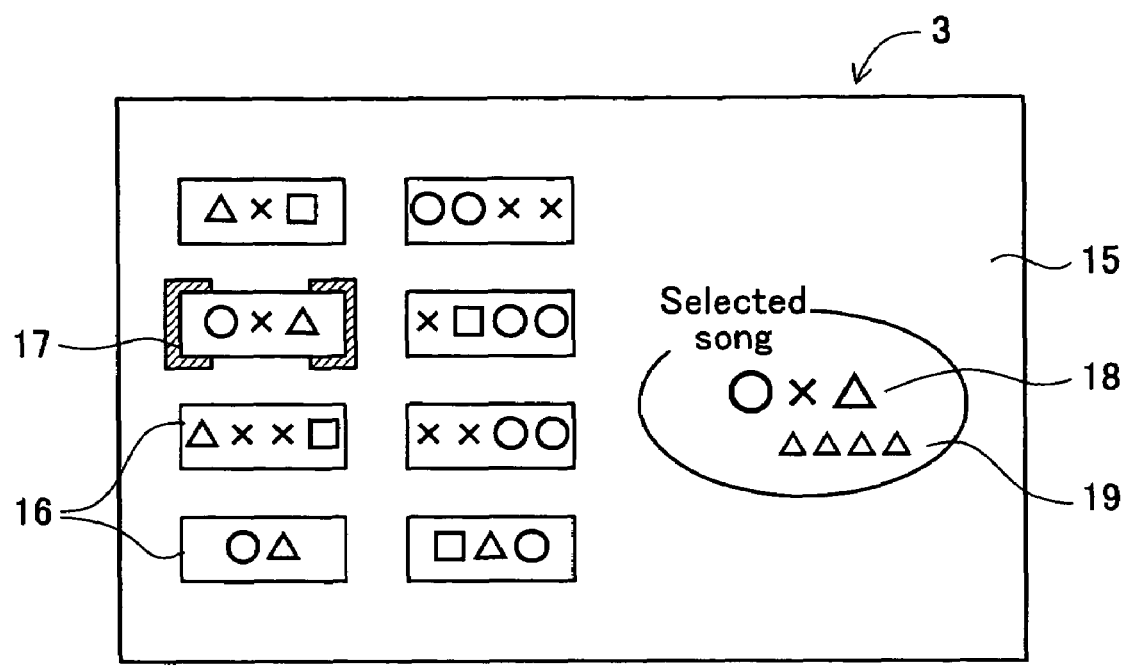
FIG. 2 is a schematic diagram showing display contents displayed on a first liquid crystal display-device before starting a typing game.
Figure 5:
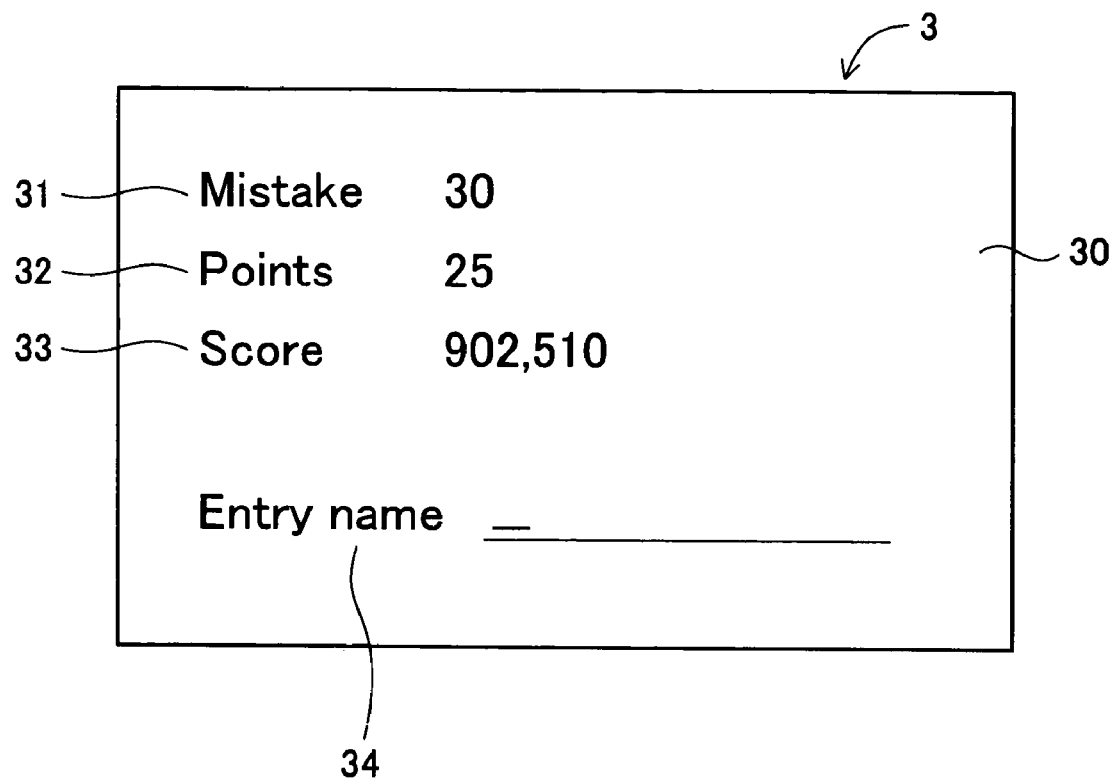
FIG. 5 is a schematic diagram showing display contents displayed on the first liquid crystal display-device after finishing the typing game.

Next, each of the display contents displayed on the first liquid crystal display-device 3 and the second liquid crystal display-device 4 are explained in detail, using FIGS. 2 through 5. Moreover, the display contents displayed by the first liquid crystal display-device 3 and the second liquid crystal display-device 4 are basically configured from three patterns: before starting the typing game, during the typing game, and after finishing the typing game. FIG. 2 is a schematic diagram showing display contents displayed on the first liquid crystal display-device 3 before starting the typing game, FIGS. 3A and 4A are schematic diagrams showing display contents displayed on the second liquid crystal display-device 4 during the typing game, FIGS. 3B and 4B are schematic diagrams showing display contents displayed on the first liquid crystal display-device 3 during the typing game, and FIG. 5 is a schematic diagram showing display contents displayed on the first liquid crystal display-device 3 after finishing the typing game.

Here, in the typing game machine 1 that is provided with and that uses the illumination devices 7 related to the present embodiment, the typing game is carried out by inputting the lyrics of music being performed. Specifically, the player first selects desired music for the game from among pieces of provided music. When the typing game is started, performance data for the music accompanying the selected piece of music and sound data for the artist vocals of the music, are reproduced. Furthermore, along with the reproduced performance data and sound data for the music, as a character string that the player must input, the music lyrics are displayed one phrase at a time in accompaniment with the reproduced sound data.

By inputting character strings corresponding to the displayed one-phrase lyrics, by the keyboard 6, the typing game progresses, and when the game is finished, the typing game results (number of typing mistakes, obtained score, points, and the like) are calculated based on various elements related to typing accuracy, timing of typing input, and the like, and are displayed. That is, the typing game in the typing game machine 1 is a competition regarding typing input skill levels, while enjoying the music performed during the game.

First, display contents before starting the typing game are explained using FIG. 2. As shown in FIG. 2, after a coin of a prescribed monetary value is inserted in the coin insertion slot 9, a song selection screen 15 showing a list of possible music for a game in the typing game machine 1 is displayed on the first liquid crystal display-device 3 before starting the typing game.

The song selection screen 15 is composed of a playable song name display area 16 displaying song names of possible music for a game, a song selection cursor 17 that can select any item from the playable song name display area 16, a selected song name display area 18 in which the song name of music selected by the song selection cursor 17 is displayed, and a selected artist name display area 19 in which the artist name for the music selected by the selection cursor is displayed.

The playable song name display area 16 shows the respective song names of playable music (a maximum of eight songs in the present embodiment) in the current typing game machine 1. Here, playable music displayed in the playable song name display area 16 includes the music stored as music data in the HDD 55 described below (see FIGS. 9 and 10), and, furthermore, the stored music data is managed by a server 80 (see FIG. 8), and is sequentially updated. Accordingly, the player can select from among plural pieces of music including the latest music updated by the server 80, and play a game. Furthermore, not only song names, but also artist photographs and PVs may be displayed in the playable song name display area 16.

Moreover, the song selection cursor 17 can be moved up, down, left, and right, over the playable song name display area 16 by operation of the cursor keys 114 (see FIG. 6) on the keyboard 6, and the song name and artist name for the music on which the song selection cursor 17 is currently positioned in the playable song name display area 16 are displayed in the selected song name display area 18 and the selected artist name display area 19.

When the enter key 112 (see FIG. 6) is pressed in a state in which the song selection cursor 17 is positioned over the playable song name display area 16 with the song name of desired music displayed, the music for playing the game is decided, and the typing game starts.

Moreover, while the song selection screen 15 is displayed on the first liquid crystal display-device 3, a PV for optional music may be run on the second liquid crystal display-device 4. Furthermore, an advertisement image, or the like, may also be displayed. In addition, the song selection screen 15 may be displayed, not on the first liquid crystal display-device 3, but on the second liquid crystal display-device 4.

Next, display contents during execution of the typing game are explained using FIGS. 3 and 4. The display contents of the first liquid crystal display-device 3 and the second liquid crystal display-device 4 are shown, respectively, in FIGS. 3A and 3B for cases in which a designated song A by a male artist is selected in the song selection screen 15 and the typing game is started, and in FIGS. 4A and 4B for cases in which a designated song B by a female artist is selected in the song selection screen 15 and the typing game is started.

As shown in FIG. 3A, in cases in which, for example, the song A is selected and a game started, PV footage 20 of a male artist singing the song A, performed via the speakers 8, is displayed on the second liquid crystal display-device 4. On the other hand, as shown in FIG. 4A, in cases in which, for example, the song B is selected and a game started, PV footage 20 of a female artist singing the song B, performed via the speakers 8, is displayed on the second liquid crystal display-device 4.

Moreover, as shown in FIGS. 3B and 4B, in parallel with the display of the PV footage 20 in the second liquid crystal display-device 4, a main game screen 21 related to the progress of the typing game is displayed on the first liquid crystal display-device 3.

Here, the main game screen 21 includes a lyrics display area 22 for displaying lyrics of a phrase currently being performed, using Chinese characters, Japanese characters, and the like, a Roman letters display area 23 for displaying the lyrics displayed in the lyrics display area 22 separately in Roman letters and also for showing an input result of the input the player types on the keyboard 6, a music state display area 25 for displaying the song number (stage number) and additionally the phrase number, counted from the start of this song number, for the phrase of the lyrics currently displayed in the lyrics display area 22 and in the Roman letters display area 23, a typing result display area 26 for displaying an error determination result for the player's typing, a score display area 27 for displaying a score, points, or the like, that the player has obtained up to now, and a song information display area 28 for displaying the artist's name and the song name currently being performed.

The lyrics display area 22 is a display area in which the lyrics of one phrase of the music currently being performed are displayed, and the game progresses by the player typing on the keyboard 6 the lyrics displayed in the lyrics display area 22. When the player correctly types the displayed lyrics, the score is gradually increased, and on the other hand, when mistakes are made in inputting the lyrics, the score is not increased, and additionally, a mistake count is incremented according to the number of input mistakes made. If, within a song number (stage) composed of the current music, this typing mistake count exceeds a prescribed number at the end of any song, the game is ended at that point (see step S38 in FIG. 13).

The lyrics of one phrase of the music currently being performed are displayed in the Roman letters display area 23 also, in the same way as in the lyrics display area 22, and the same lyrics are displayed in Roman letter notation. Moreover, in the displayed lyrics, the character string 23A already typed by the player is compared to the character string 23B before typing and is moved lower down and displayed, so that the player can be informed about the characters typed up to now.

In addition, the music state display area 25 indicates the song number of the lyrics phrase currently displayed in the lyrics display area 22 and the Roman letters display area 23, and displays the corresponding phrase number, counting from the start of the song. Here, the typing game that is provided with and that uses the illumination devices 7 related to the present embodiment, is formed of stages (for example, from a first to a third stage) corresponding to the song numbers (for example, from 1 to 3) of the reproduced music. For example, FIG. 3B shows the fifteenth phrase of the first stage (song number 1) currently being displayed. Additionally, FIG. 4B shows the fifth phrase of the second stage (song number 2) currently being displayed.

As each input of a single phrase by the player is completed, a numeric value 25A indicating the phrase number thereof is incremented by one, and as input of each single stage is completed, a numeric value 25B indicating the stage number (song number) thereof is incremented by one. In this way, the player can be informed of the current stage number (song number) and the number of phrases for which typing has been completed up to now.

The typing result display area 26 is a display area for displaying an error determination result for the typing of the player, and in cases in which correct characters corresponding to and with the same timing as the sound of the performed music are typed, "PERFECT" is displayed. Furthermore, in cases in which correct characters are typed with timing different from the sound in the performed music, "GOOD" is displayed. However, irrespective of the timing, in cases in which mistaken characters are typed, "MISTAKE" is displayed.

The score display area 27 is a display area for displaying the score and points obtained by the player up to now. Here, the score is incremented for correct typing in accordance with the character string displayed in the lyrics display area 22 and the Roman letters display area 23, and additionally, in cases in which characters corresponding to, and with the same timing as, the sound in the performed music are typed, the score is further incremented. Moreover, in cases in which the characters of one phrase are input without any typing mistake, the points are incremented by one (step S35 in FIG. 13).

Incrementing of the score and points is carried out until the game is completed, and in cases in which the IC card is inserted into the card insertion slot 10 of the center panel 5, at the completion of the game the score and points obtained therefor are stored on the IC card.

Furthermore, the song name and the artist name that the player selected at the start of the game and that are currently being performed are respectively displayed in the song information display area 28.

Furthermore, as shown in FIGS. 3B and 4B, an independent image area 101 is arranged in an upper central region of in the main game screen 21 in the first liquid crystal display-device 3. In this regard, the independent image area 101 is arranged not to overlap with the lyrics display area 22, the Roman letter display area 23, the music state display area 25, the typing results display area 26, the score display area 27, and the song information display area 28, within the main game screen 21. The PV footage 20 displayed on the second liquid crystal display-device 4 is displayed with the same timing in the independent image area 101.

Furthermore, as shown in FIGS. 3A and 4A, in the upper left corner area of the second liquid crystal display-device 4 in which the PV footage 20 is displayed, an artist name information display area 201 displaying the name of the artist currently performing is arranged, and in the lower right corner area of the second liquid crystal display-device 4 in which the PV footage 20 is displayed, a song name information display area 202 displaying the name of the song currently being performed is arranged. Furthermore, as shown in FIGS. 3B and 4B, the artist name and the song name are displayed respectively in the upper left corner and the lower right corner of the independent image area 101 of the main game screen 21 in the first liquid crystal display-device 3.

In this regard, in the upper edge area and the lower edge area of the independent image area 101, in addition to the artist's name and the song name, the phrase number for the music currently being performed, the stage number (song number) therefor, and the score, the points, and the like, obtained by the player up to now, may be displayed, or, conversely, may not be displayed.

Furthermore, in the present embodiment, the main game screen 21 is displayed on the first liquid crystal display-device 3, and the PV footage 20 is displayed on the second liquid crystal display-device 4; conversely, however, the PV footage 20 may be displayed on the first liquid crystal display-device 3, and the main game screen 21 may be displayed on the second liquid crystal display-device 4.

In these cases, the independent image area 101 is arranged in the upper central region of the main game screen 21 displayed on the second liquid crystal display-device 4, and in this independent image area 101, the PV footage 20 displayed on the first liquid crystal display-device 3 is displayed with the same timing.

As shown in FIG. 5, after the typing game has been finished, the game results screen 30 showing the game results of the current typing game is displayed on the first liquid crystal display-device 3.

The game results screen 30 is composed of a mistake count display area 31 displaying the number of typing mistakes for the current typing game, an obtained points display area 32 for displaying the points obtained, an obtained score display area 33 for displaying the score obtained, and a name input display area 34 that prompts the player of the game to input his or her name.

By referring to the game results screen 30, the player can acknowledge the mistake count, and the obtained points and score, respectively, for the current typing game. Furthermore, by inputting an optional name in the name input display area 34 using the keyboard 6, the obtained score can be recorded for ranking. A list of recorded rankings is displayed in a demonstration screen, or the like, on the first liquid crystal display-device 3 or the second liquid crystal display-device 4.

Furthermore, while the game results screen 30 is displayed on the first liquid crystal display-device 3, the lyrics of the song used in the game may be run, and places where correct input could not be done may be displayed with underlining or the like, with scrolling from a lower to an upper direction displayed, and in addition, a PV for an optional piece of music may be run on the second liquid crystal display-device 4. Furthermore, an advertisement image or the like may also be displayed. Additionally, the game results screen 30 may be displayed, not on the first liquid crystal display-device 3, but on the second liquid crystal display-device 4.

Figure 6:
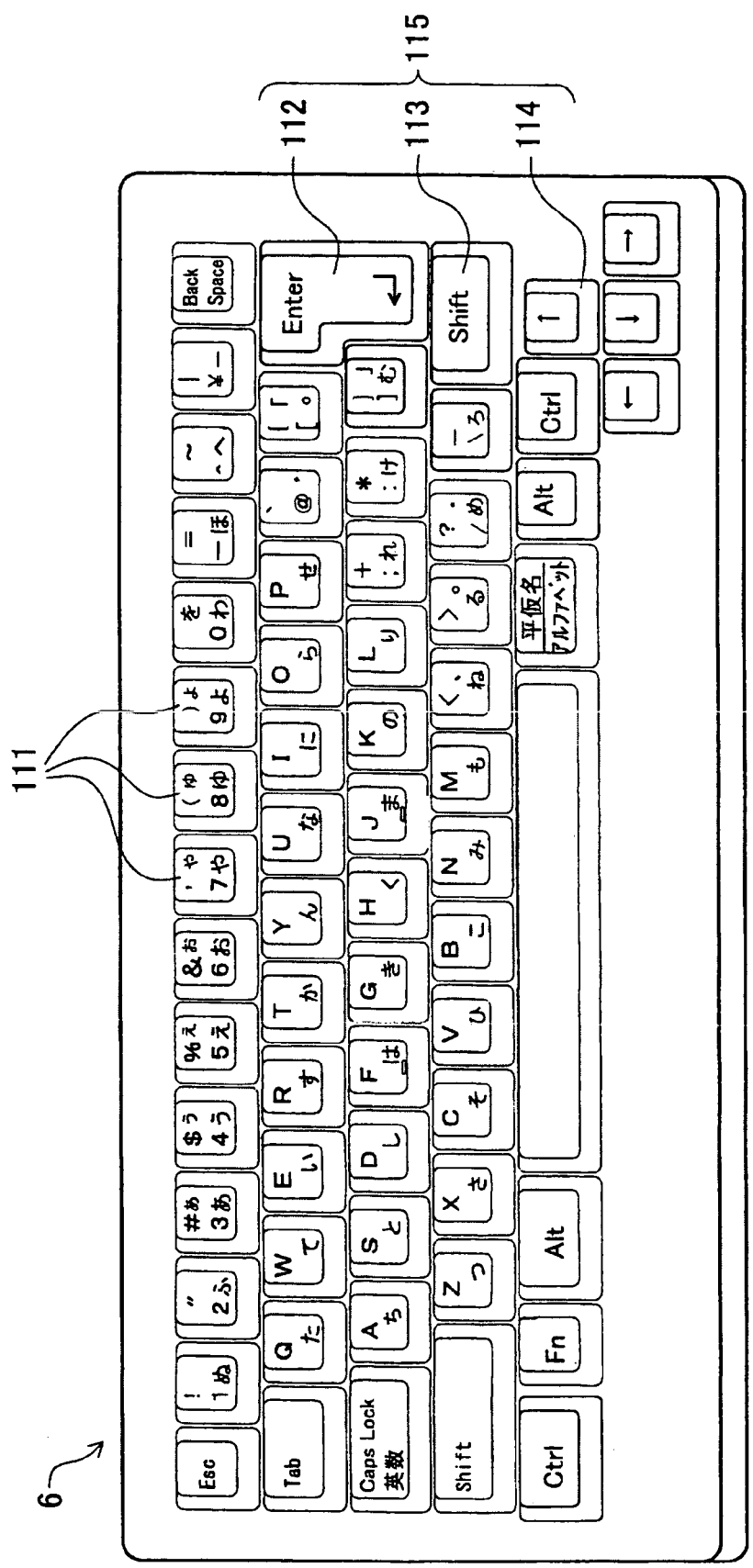
FIG. 6 is a plan view of a keyboard of the typing game machine that is provided with and that uses the illumination devices related to the present embodiment.
Figure 7:
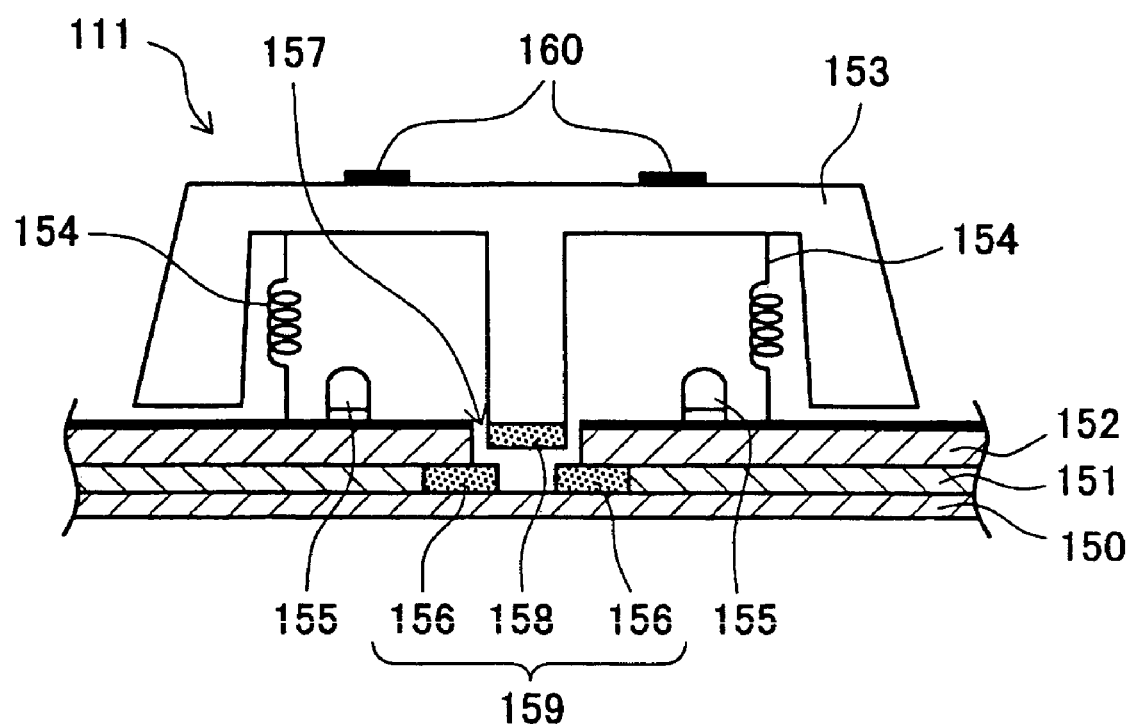
FIG. 7 is a schematic cross-sectional view of any one of plural keys provided in the keyboard.

Next, the keyboard 6 provided in the typing game machine 1 is explained using FIGS. 6 and 7. FIG. 6 is a plan view showing the keyboard of the typing game machine that is provided with and that uses the illumination devices related to the present embodiment. FIG. 7 is a schematic sectional view of any one of the keys provided in the keyboard.

As shown in FIG. 6, the keyboard 6 is a Japanese 108-key keyboard on which character input keys 111 for performing input of Roman letters (A to Z), Japanese characters, numbers 0 to 9, symbols (period, comma), and the like, and function keys 115 such as an enter key 112, a shift key 113, cursor keys 114, and the like, are respectively arrayed. In a game, the player performs character input by typing on the character input keys 111 corresponding to characters, symbols, numerals, and the like, and progresses with the game, issuing commands by operation of the function keys 115, to select songs for performing the game and the degree of game difficulty, before starting a game, after completing a game, or similar situations, and to start executing the game and the like. Furthermore, an illuminating LED is provided inside the various kinds of keys in the keyboard 6, and the keys are configured to emit light in various modes based on control signals from the CPU 51.

The internal structure of keys in the keyboard 6 is explained here, in accordance with FIG. 7. Furthermore, the keys arrayed in the keyboard 6 all have a similar internal structure. Accordingly, among the keys arrayed in the keyboard 6, the internal structure of one character input key 111 is explained below, as an example, and explanations of other character input keys 111 and function keys 115 are omitted.

As shown in FIG. 7, the character input key 111 is basically composed of a base board 150, a switch circuit board 151, an illumination circuit board 152, a key top 153, a biasing mechanism 154, and the full color LEDs 155.

In this regard, a pair of electrodes 156, disposed directly beneath the vicinity of the center of the key top 153, are arranged in the switch circuit board 151 laid on the base board 150.

Furthermore, in order to expose the abovementioned pair of electrodes 156, an opening 157 is arranged in the illumination circuit board 152 laid on the switch circuit board 151, and the full color LEDs 155 that can be illuminated in full color are arranged in the surrounding area of this opening 157.

Furthermore, the biasing mechanism 154 is arranged between the illumination circuit board 152 and the key top 153, and the key top 153 is urged by this biasing mechanism 154 on the opposite side of the switch circuit board 151. In addition, in the vicinity of the center of the key top 153, an electrode 158 protrudes towards the switch circuit board 151. Accordingly, when a pressing operation is made on the key top 153, the electrode 158 protruding from the key top 153 can be made to touch the pair of electrodes 156 arranged on the switch circuit board 151, so that the fact that the key top 153 was pressed can be communicated as an electrical signal flowing in the switch circuit board 151. That is, a key switch 159 is configured from these three electrodes 156 and 158.

Furthermore, the biasing mechanism 154 may be composed of an elastic body only, of an elastic body and a bridge mechanism, or any suitable configuration.

Moreover, the key top 153 is formed of a translucent material (for example, transparent acrylic, transparent plastic, or the like), with key information 160 such as characters, numerals, symbols, and the like, printed in black on the flat surface thereof. Additionally, the surface of the illumination circuit board 152, on the key top 153 side, is also printed in black.

Therefore, when the full color LEDs 155 are extinguished, since the translucent key top 153 reflects the black color that is the color of the surface of the illumination circuit board 152, the key information 160 printed in black on the key top 153, on which the black color is reflected, becomes hard to perceive.

However, when the full color LEDs 155 are illuminated, since the translucent key top 153 reflects the illuminated color of the full color LEDs 155, the key information 160 printed in black on the key top 153, on which the color is reflected, becomes easy to perceive.

In the keyboard 6, the key switch 159 that is inside each key is connected to a transmission circuit, which is not shown in the figures. The transmission circuit is connected to the CPU 51 of the typing game machine 1, via an interface unit 52

(referred to as I/O below), which is described below. Accordingly, by transmission of an electrical signal from the key switch 159 of a key that has been pressed, to the CPU 51, via the transmission circuit, it is possible to identify the type of key that has been pressed. Furthermore, the transmission circuit is installed on the abovementioned switch circuit board 151.

In addition, in the keyboard 6, the full color LEDs 155 inside the keys are connected to an illumination control circuit 62. Furthermore, the illumination control circuit 62 is connected via the I/O 52 to the CPU 51 (see FIG. 9). Accordingly, it is possible to illuminate the full color LEDs 155 inside the keys, via the illumination control circuit 62, with a color specified by the CPU 51. Specifically, in the typing game machine 1 that is provided with and that uses the illumination devices 7 related to the present embodiment, during a typing game, when there is key input and when it is judged that correct typing has been performed, the character input key 111 that was pressed is illuminated with a blue color. In addition, when there has been key input and it is judged that there has been a typing mistake, the character input key 111 that was pressed is illuminated with a red color, and the correct key that should have been used for input is illuminated with a green color. Furthermore, where there has been no key input, the correct key only, which should be used for input, is illuminated with a green color.

Figure 8:
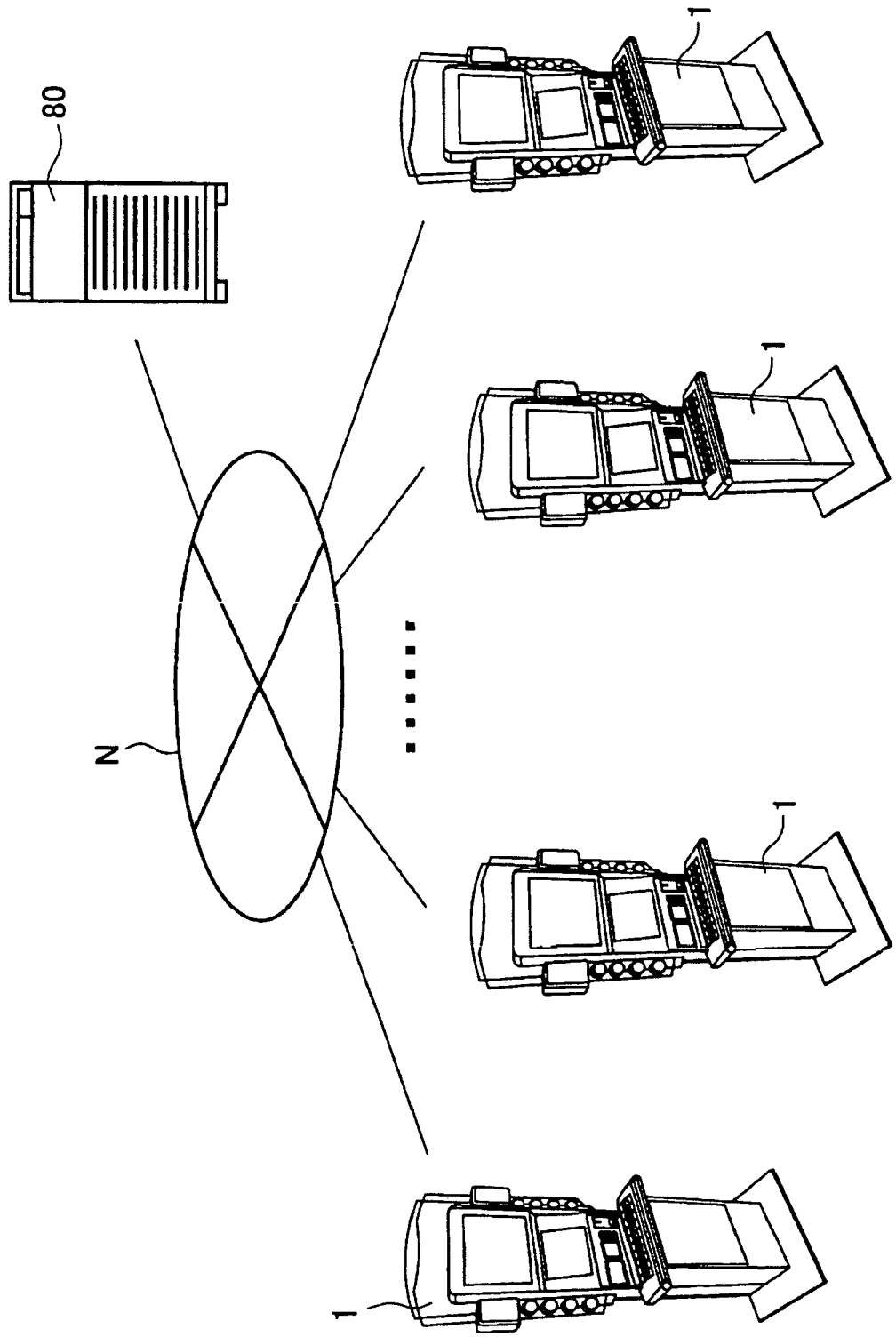
FIG. 8 is a system block diagram showing a system including a server and typing game machines that are provided with and that use the illumination devices related to the present embodiment.

Moreover, the typing game machine 1 that is provided with and that uses the illumination devices 7 related to the present embodiment, as shown in FIG. 8, is connected to the server 80 via a network N in which bi-directional communication is possible, such as the Internet or the like. Based on data transmitted from the server 80, it is possible to update the music data stored on the HDD 55 (see FIG. 9) of the typing game machine 1.

Accordingly, by updating the music data, it is possible to vary the kinds of playable music in the typing game machine 1, and by collectively managing the typing game machines installed in various game establishments, the task of updating the data is facilitated.

Figure 14:
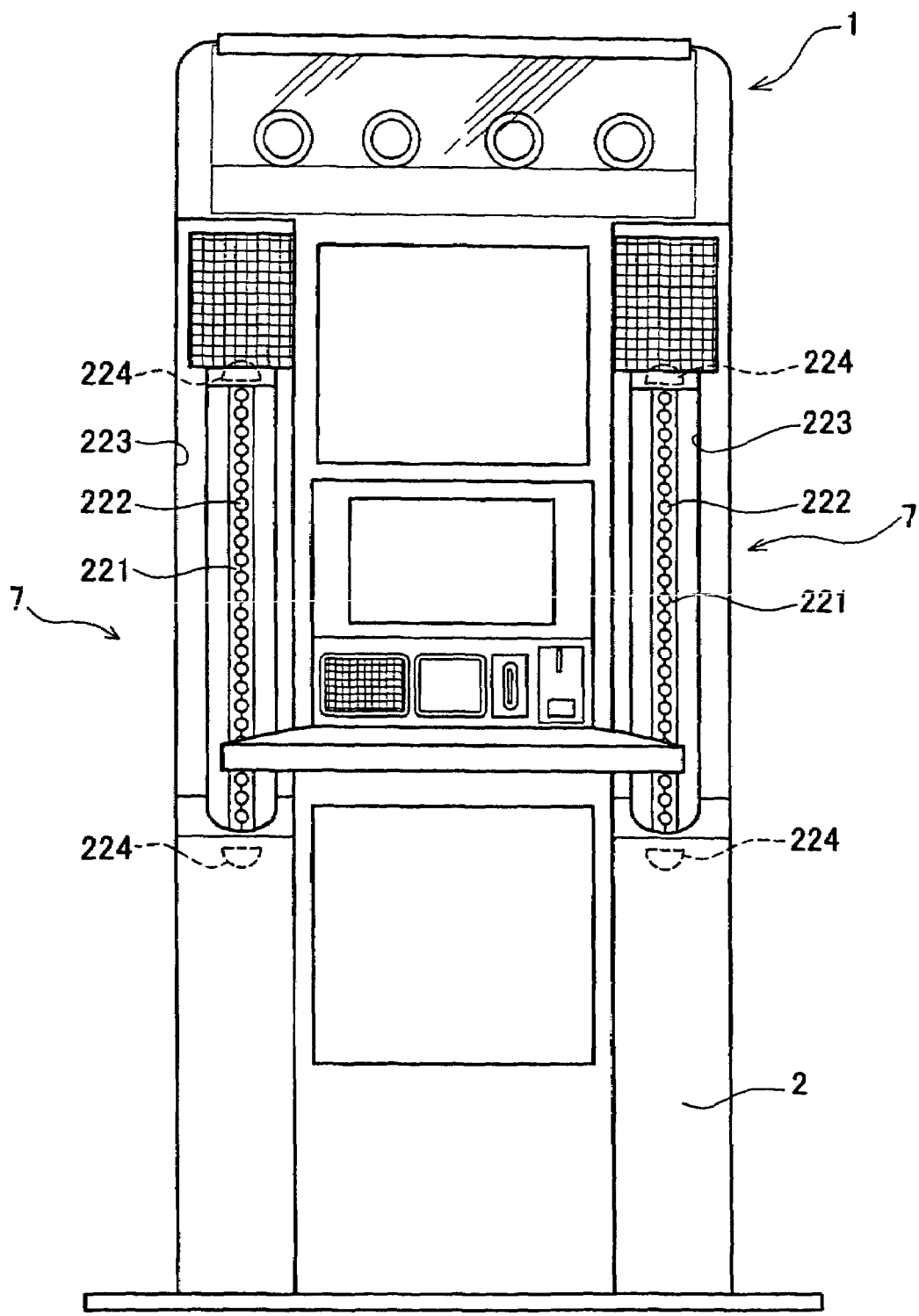
FIG. 14 is a front view of the typing game machine that is provided with and that uses the illumination devices related to the present embodiment, with the inside of a cylindrical transparent member of the illumination devices visible.
Figure 15:
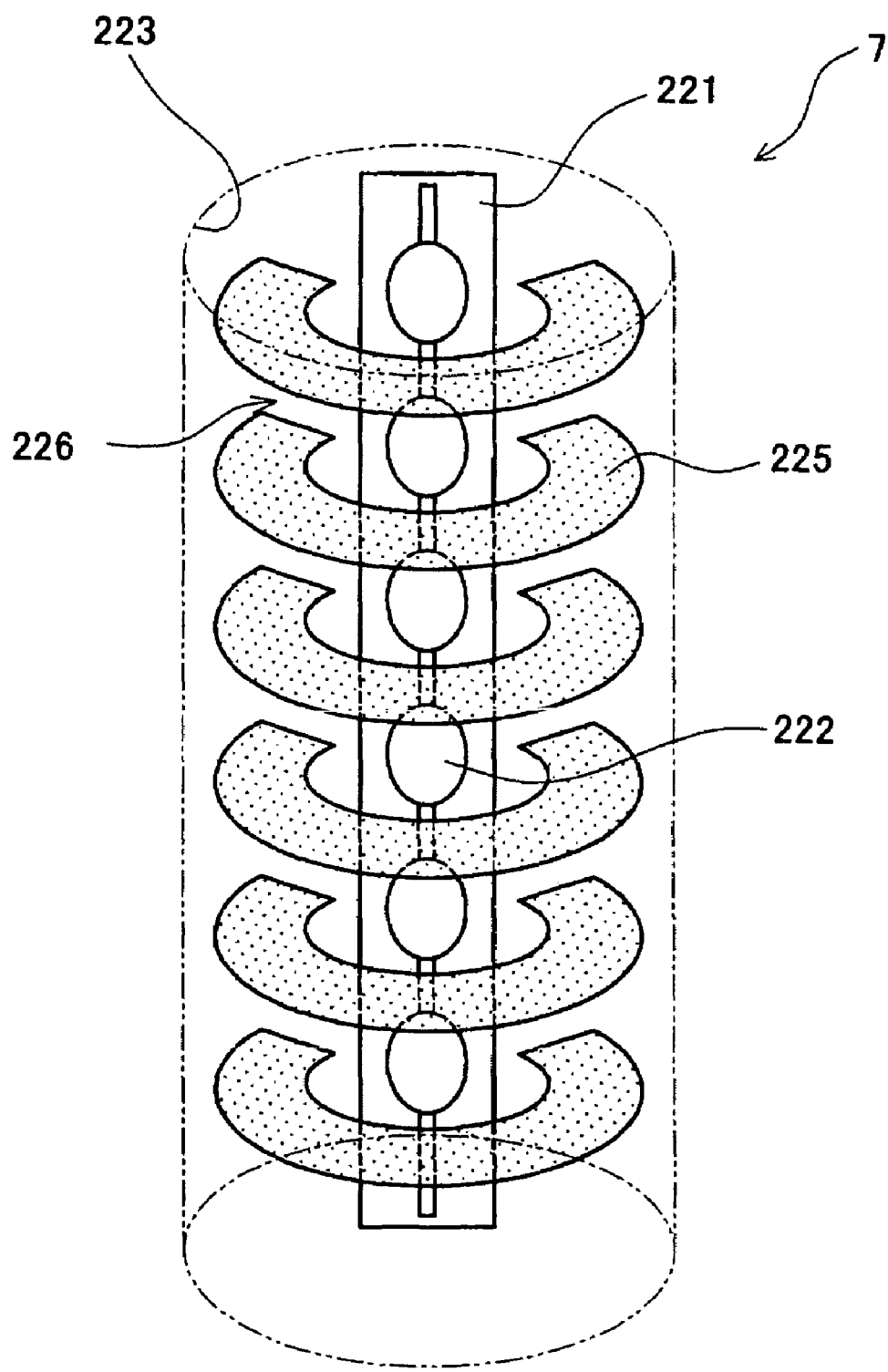
FIG. 15 is a schematic view of part of a configuration of an illumination device in the typing game machine that is provided with and that uses the illumination devices related to the present embodiment.
Figure 29:
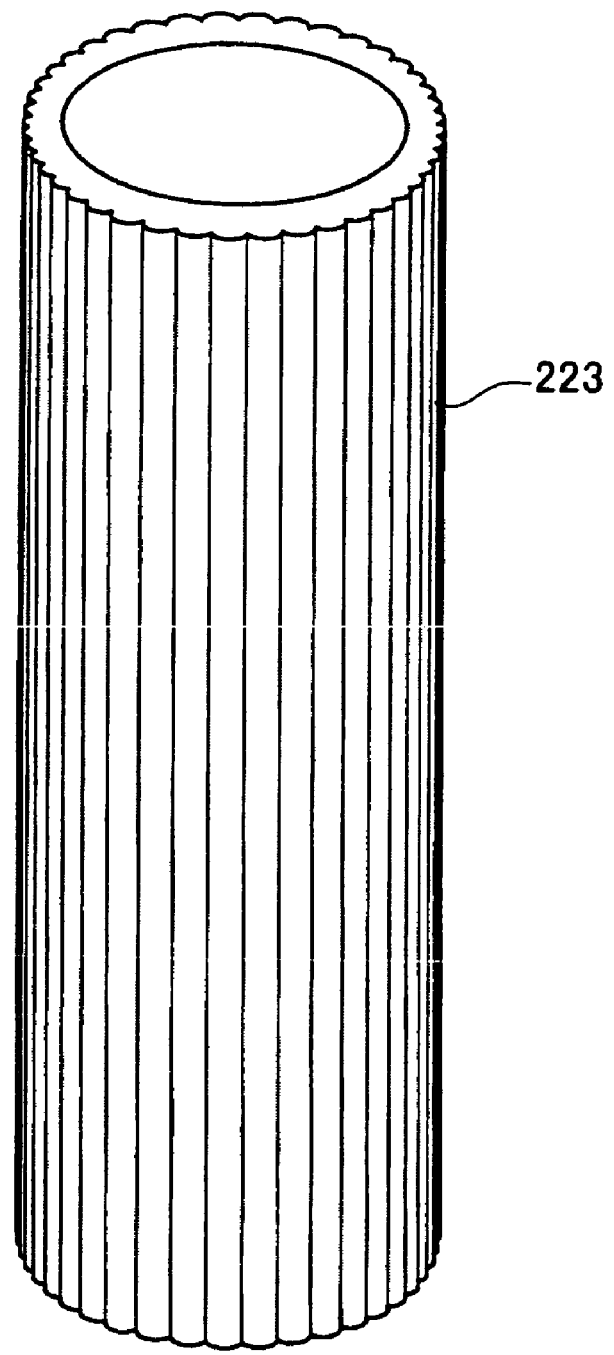
FIG. 29 is a schematic view of the transparent member of the illumination device in the typing game machine provided with and using the illumination devices related to the present embodiment.

Next, a configuration of the illumination devices 7 provided in the typing game machine 1 is explained, using FIGS. 14, 15, and 29. FIG. 14 is front view of the typing game machine that is provided with and that uses the illumination devices 7 related to the present embodiment, with the inside of the cylindrical transparent members of the illumination devices visible. FIG. 15 is a schematic view of part of a configuration of one of the illumination devices in the typing game machine that is provided with and that uses the illumination devices related to the present embodiment. FIG. 29 is a perspective view of a transparent member of the illumination device in the typing game machine that is provided with and that uses the illumination devices related to the present embodiment.

As shown in FIG. 14, the illumination devices 7 provided in the typing game machine 1 are arranged one at each edge of the front face of the cabinet 2, and each illumination device is configured from an optical shield 221, the twenty-four full color LEDs 222, the cylindrical transparent member 223, halogen lamps 224, and the like.

In this regard, the optical shield 221 is, for example, formed from a long board-shaped member that does not allow the transmission of light, such as a white colored light-diffusion preventing sheet, or the like, and has the twenty-four full color LEDs 222 fixed in a longitudinal direction at equal intervals. Furthermore, the cylindrical transparent member 223 is the lenticular lens formed in the shape of a cylinder, and is fixed to the cabinet 2, with the longitudinal direction of the cylinder vertical. Inside the cylindrical transparent member 223, the optical shield 221, to which the twenty-four full color LEDs 222 are fixed, is arranged so that the twenty-four full color LEDs 222 are on its front face. In this way, the twenty-four full color LEDs 222 are laid in a vertical direction at equal intervals inside the transparent member 223, and, additionally, the optical shield 221 is disposed inside the cylindrical transparent member 223, at the front face of the cabinet 2 that is behind the twenty-four full color LEDs 222.

Moreover, the lenticular lens is formed of cylindrical lenses in parallel having a Quonset shape, so that the focal position varies according to viewing angle with respect to the radial direction of each lens. Accordingly, the light is diffused in one direction (a direction perpendicular to the lens). That is, since the lenticular lens forming the cylindrical transparent member 223 is formed of the Quonset shaped lenses (in cross-sectional shape) in parallel (cylindrical lenses), and, using a sheet form here, as shown in FIG. 29, the longitudinal direction of the cylindrical side face of the transparent member 223 corresponds to the longitudinal direction of the cylindrical lenses. Each one of the Quonset shaped convex lenses compresses (focuses) an image, and the focal position varies according to the viewing angle in a radial direction of the Quonset shaped lenses.

Furthermore, the transparent member 223 may have a cylindrical shape, or may have, for example, a cylindrical shape with a hollow center that is polygonal in cross-section, or a cylindrical shape with circular or polygonal shaped rings stacked on one other. In addition, the number of full color LEDs 222 fixed at equal intervals to the optical shield 221 need not be limited to twenty four, and, for example, may be thirty two. Furthermore, if the various full color LEDS 222 are fixed at equal intervals in a rod shaped member, they may be separated from the optical shield 221, and may be arranged inside the cylindrical transparent member 223.

In each illumination device 7 that has this kind of configuration, when one full color LED 222 emits light, one light emitting ring lying in a horizontal direction can be displayed in the transparent member 223, and in addition, when twenty-four full color LEDs 222 emit light, as shown in FIG. 1, a mode-with twenty-four light emitting rings lying in a horizontal direction and stacked on one another in a vertical direction can be displayed in the transparent member 223. That is, light emitting rings corresponding to the number of full color LEDs 222 arranged inside the transparent member 223 can be displayed in the transparent member 223.

Accordingly, in the illumination devices 7, by the geometrical positional relationship between the cylindrical transparent member 223 that is the lenticular lens, and the full color LEDs 222 inside the transparent member 223, when light is emitted from the full color LEDs 222, twenty-four light emitting rings lying in a horizontal direction can be displayed in a vertical direction inside the cylindrical transparent member 223, and by various types of light emission control with respect to the full color LEDs 222, a presentation in stages, by the twenty four light emitting rings, is possible, and a new illumination presentation can be performed.

However, if the light emitted by the full color LEDs 222, that passes through the transparent member 223 is reflected by the cabinet 2, or the like, and again passes through and returns to the inside of the transparent member 223, the light emitting shapes in the transparent member 223 cannot be displayed as rings. Consequently, inside the transparent member 223, as shown schematically in FIG. 15, the optical shield 221 restricts an area on an inner face of the transparent member 223, radiated by light emitted from the full color LEDs 222, and light reflected by the cabinet 2, or the like, is prevented from returning again to the inside of the transparent member 223. That is, by superimposing on the cabinet 2, or the like, a projection area generated by the optical shield 221 with respect to the full color LEDs 222, the generation of light reflected from the cabinet 2, or the like, is prevented.

Here, in FIG. 15, for convenience in explaining, a horizontal component of the light is considered, and the horizontal component for an area radiated by the full color LEDs 222 is shown by reference symbol 225; in addition, a horizontal component for a blocked area (referred to below as simply "full color LEDs 222 blocked area") generated by the optical shield 221, with respect to the full color LEDs 222, is shown by the reference symbol 226.

Here, in cases in which the full color LEDs 222 are fixed to the optical shield 221, from the geometrical positional relationship between them, if the width of the optical shield 221 in a short direction is decreased, the horizontal component 225 for the area radiated by the full color LEDs 222 widens, and the horizontal component 226 for the blocked area with respect to the full color LEDs 222 narrows; in addition, if the width of the optical shield 221 in the short direction is enlarged, the horizontal component 225 for the area radiated by the full color LEDs 222 narrows, and the horizontal component 226 for the blocked area with respect to the full color LEDs 222 widens. On the other hand, in cases in which the optical shield 221 is separated from the full color LEDs 222, from the geometrical positional relationship between them, if the optical shield 221 is pushed closer to the inner face of the transparent member 223, the horizontal component 225 for the area radiated by the full color LEDs 222 widens, and the horizontal component 226 for the blocked area with respect to the full color LEDs 222 narrows; in addition, if the optical shield 221 is pushed closer to the full color LEDs 222, the horizontal component 225 for the area radiated by the full color LEDs 222 narrows, and the horizontal component 226 for the blocked area with respect to the full color LEDs 222 widens.

Accordingly, if the cylindrical transparent members 223, unlike the present embodiment, are fixed in positions outside of the two edges of the front face of the cabinet 2 (for example, the two side faces of the cabinet 2), in view of the geometrical positional relationship of the cylindrical transparent members 223, the cabinet 2, the full color LEDs 222, the optical shields 221, and the like, by deciding the width of the optical shields 221 in the short direction, or deciding the distance between the optical shields 221 and the transparent members 223, the light emission by the transparent members 223 can be displayed as a ring shape.

Returning to FIG. 14, the halogen lamps 224 are disposed facing each other, at the top end and the bottom end of the cylindrical transparent members 223, and by continuously irradiating the inside of the cylindrical transparent members 223, the cylindrical transparent members 223 in which the light emitting rings can be displayed are highlighted more, and also for onlookers at a distance from the typing game machine 1, the plurality of light emitting rings (a score ring 241 and a points ring 242 described below, see FIGS. 22 through 28 below) that can be displayed in the cylindrical transparent members 223 are made clearer.

Figure 9:
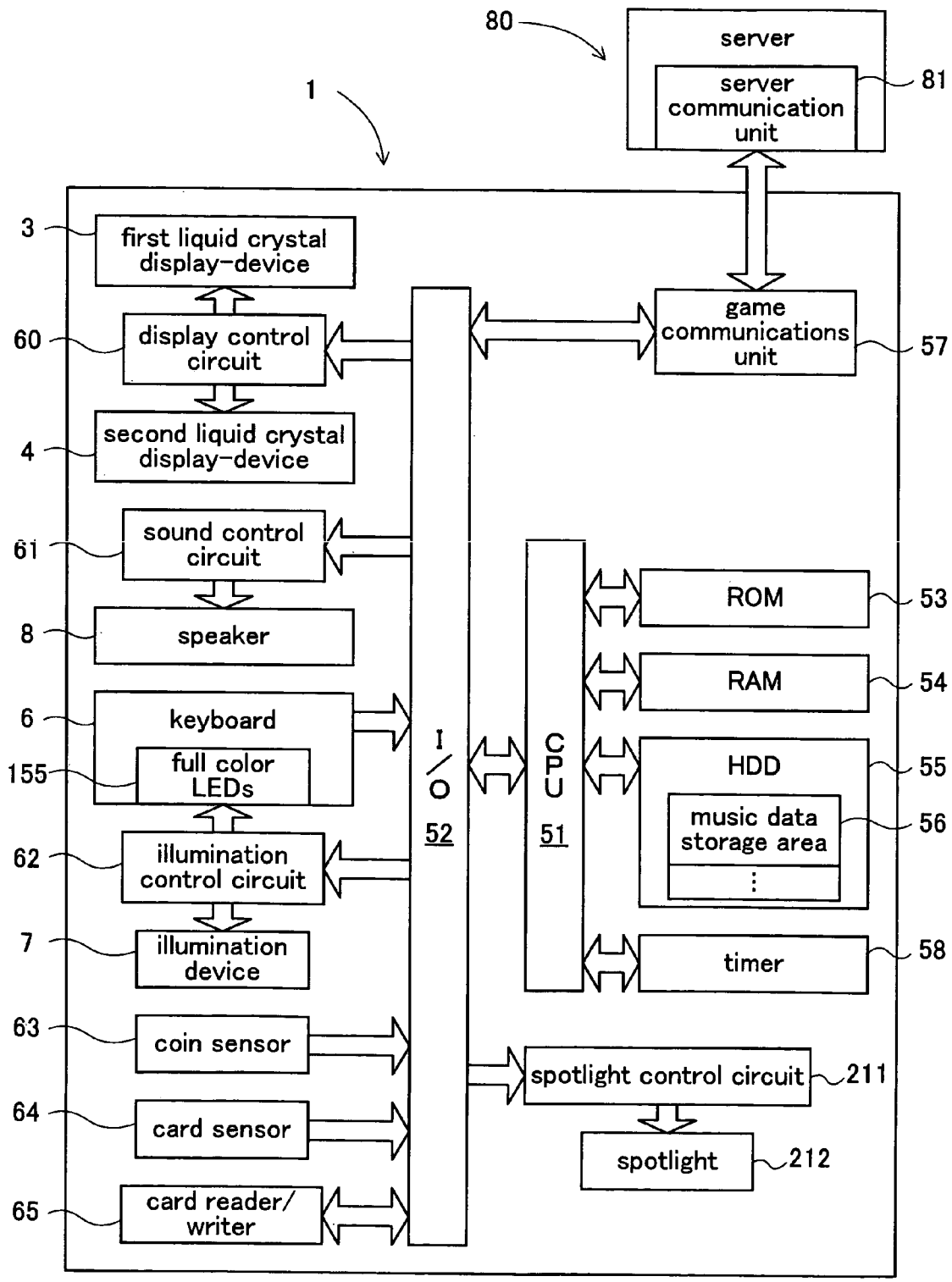
FIG. 9 is a block diagram schematically showing a control system for the typing game machine that is provided with and that uses the illumination devices related to the present embodiment.

Next, a configuration related to a control system for the typing game machine 1 is explained, in accordance with FIG. 9. FIG. 9 is a block diagram schematically showing the control system for the typing game machine that is provided with and that uses the illumination devices related to the present embodiment.

As shown in FIG. 9, the control system of the typing game machine 1 is configured from the CPU 51 for administering various types of control such as game processing operations and the like, in the typing game machine 1, a ROM 53 and a RAM 54 connected to the CPU 51, and peripheral devices (actuators) electrically connected to the CPU 51.

The CPU 51 is a central processing unit for performing computation processing according to various types of command. The I/O 52 is a connecting unit for electrically connecting, directly or indirectly, the first liquid crystal display-device 3, the second liquid crystal display-device 4, the keyboard 6, the illumination devices 7, the speakers 8, the spotlights 212, and the like, to the CPU 51.

The ROM 53 is a nonvolatile read-only memory in which a program for running operations according to the flowchart described below is stored.

Furthermore, the RAM 54 is a memory for temporarily storing various types of data computed by the CPU 51, and in the typing game, it stores the number of typing mistakes, obtained score, obtained points, and the like, for the player. In addition, in the plural music data stored on the HDD 55 described below, the lyrics data for the music data used in the current typing game is split into single phrases and is temporarily stored in the RAM 54.

The HDD 55 is a storage device for storing the music data used when the typing game is executed in the typing game machine 1. Here, the music data is composed of video data, performance data, sound data, lyrics data, determination criteria data, illumination device illumination pattern data, keyboard illumination pattern data, and time-limit data, and each of these is stored in various storage areas of the music data storage area 56 formed on the HDD 55 (see FIG. 10).

Furthermore, plural music data items (in the present embodiment, a maximum of eight) are stored in the music data storage area 56, and the various music data items stored on the basis of data transmitted from the server 80, as described above, are continually updated. The varieties of song names displayed on the song selection screen 15 (see FIG. 2), based on the music data varieties stored in the music data storage area 56, are modified, and the typing game is played based on the music data corresponding to the music selected on the song selection screen 15 (see FIG. 3 and FIG. 4).

Figure 10:
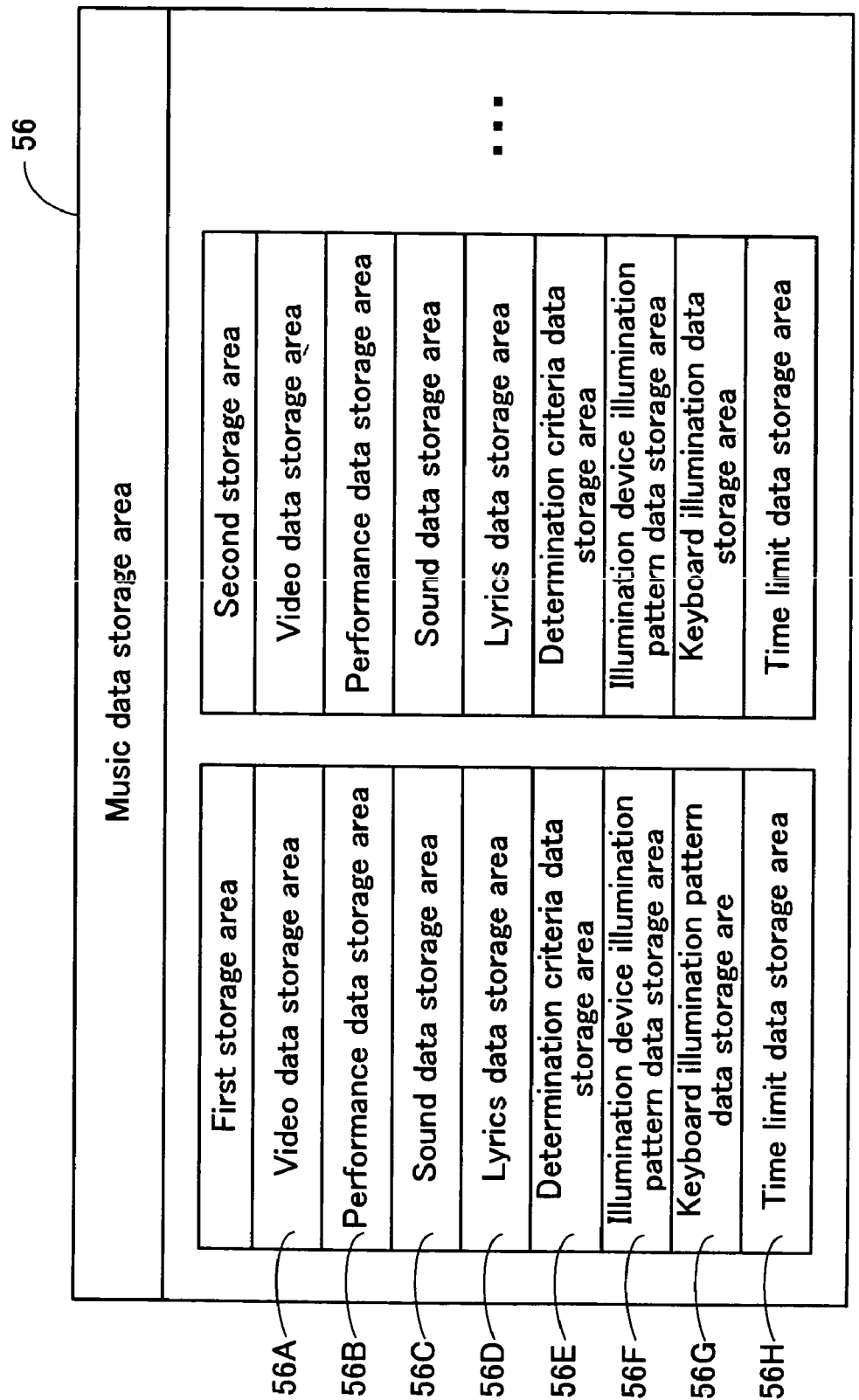
FIG. 10 is a schematic diagram showing a music data storage area of a HDD (hard disk drive) of the typing game machine that is provided with and that uses the illumination devices related to the present embodiment.

Here, the music data storage area 56 formed on the HDD 55 is explained in detail, using FIG. 10. FIG. 10 is an explanatory diagram schematically showing the music data storage areas.

As shown in FIG. 10, the music data storage area 56 in the typing game machine 1 that is provided with and that uses the illumination devices 7 related to the present embodiment, is composed of plural storage areas (in the present embodiment, storage areas 1 to 8) corresponding to the number of pieces of music data that can be stored (eight songs in the present embodiment), and in each storage area, a video data storage area 56A, a performance data storage area 56B, a sound data storage area 56C, a lyrics data storage area 56D, a determination criteria data storage area 56E, an illumination device illumination pattern data storage area 56F, a keyboard illumination pattern data storage area 56G, and a time limit data storage area 56H are provided.

Each storage area is explained as follows. The video data storage area 56 A is a storage area for storing, among the music data, video data related to the PV footage 20 (see FIGS. 3A and 4A) of the artist displayed in the independent image area 101 on the main game screen 21 on the first liquid crystal display-device 3 and, with the same timing, on the second liquid crystal display-device 4.

The performance data storage area 56B is a storage area for storing, among the music data, performance data related to backing by musical instruments and the like, output from the speakers 8.

The sound data storage area 56C is a storage area for storing, among the music data, sound data related to vocals sung by the artist output from the speakers 8.

The lyrics data storage area 56D is a storage area for storing, among the music data, lyrics data related to text data for the music lyrics. As described above, when a typing game is played, the lyrics are displayed one phrase at a time on the first liquid crystal display-device 3 (see FIGS. 3B and 4B).

The determination criteria data storage area 56E is a storage area for storing, among the music data, determination criteria data related-to criteria for error determination of characters typed by the player and error determination of input timing, when a typing game is played. The CPU 51 increments the mistake count, the score, the points, and the like, based on the stored determination criteria data and operation signals from the keyboard 6, as described below.

Furthermore, the illumination device illumination pattern data storage area 56F and the keyboard illumination pattern data storage area 56G are storage areas for storing, among the music data, illumination device illumination pattern data for making the illumination devices 7 emit light, and keyboard illumination pattern data for making the full color LEDs 155 arranged inside the keys emit light. In the typing game machine 1 that is provided with and that uses the illumination devices 7 related to the present embodiment, the pair of illumination devices 7 are illumination-controlled to give respective light emitting modes (illumination color, and whether illuminated or extinguished) by the illumination control circuit 62 described below, when the typing game is being played, based on the stored illumination device illumination pattern data and a typing game execution program (see FIG. 13) described below. These light emitting modes (illumination color, and whether illuminated or extinguished) are described below. Furthermore, the full color LEDs 155 arranged inside the keys are illumination-controlled to give respective light emitting modes (illumination color, and whether illuminated or extinguished) by the illumination control circuit 62 described below, when the typing game is being played, based on the stored keyboard illumination pattern data. In addition, illumination patterns for the full color LEDs 155 include, for a typing game novice, an illumination pattern for aiding key input by sequentially illuminating the keys that should be used for input with a different illumination color to the illumination color of the overall keyboard 6, and a pattern that varies the illumination color of all keys arrayed on the keyboard 6 to match the music image.

The time limit data storage area 56H is a storage area for storing, among the music data, time limit data related to time limitations for usage of the music data, and the time limit data is composed of data concerning two dates: a date on which the music data can be used (usage commencement date) and a date on which the music data can no longer be used (usage completion date). This time limit data is used in a timer 58 (see FIG. 9) and also in management of usage time limitations for the various music data, and the CPU 51 provides control so that typing games using music data whose usage time limit has passed cannot be played.

Returning to FIG. 9, explanations of the control system for the typing game machine 1 are continued here.

A game communication unit 57 is a device that converts signals sent out by the typing game machine 1 into signals in a transmittable format in accordance with communication formats for telephone lines, LAN cables, and the like, transmits them to the server 80, and receives signals transmitted from the server 80, reconverting them into signals in a format that the typing game machine 1 can read; and is connected to a server communication unit 81 in the server 80 via a network N in which bi-directional communication is possible, such as the Internet or the like (see FIG. 8).

In addition, the timer 58 is connected to the CPU 51. Information from the timer 58 is transmitted to the CPU 51, and, from the timer 58 information and the time limit data stored in the time limit data storage area 56 of the HDD 55, the CPU 51 manages the usage time limits for the stored music data.

Furthermore, the display control circuit 60 is connected, via the I/O 52, to the CPU 51, and is a unit for controlling display contents on the first liquid crystal display-device 3 and the second liquid crystal display-device 4, according to computational processing results of the CPU 51. Here, the display control circuit 60 is composed of a program ROM, an image ROM, an image control CPU, a working RAM, a VDP (video display processor), a video RAM, and the like. An image control program and various types of selection table related to the displays on the first liquid crystal display-device 3 and the second liquid crystal display-device 4 are stored in the program ROM. In particular, the image control program and the various types of selection table necessary when arranging the independent image area 101 in the upper central region of the main game screen 21 on the first liquid crystal display-device 4, and when the PV footage 20 is displayed with the same timing in the independent image area 101 and on the second liquid crystal display-device 4, are stored. Additionally, the image ROM stores, for example, dot data for forming images such as the song selection screen 15 (see FIG. 2), the main game screen 21 (see FIGS. 3 and 4), and the like, displayed on the first liquid crystal display-device 3.

The image control CPU performs decision-making concerning images, from among the dot data stored in advance in the image ROM, displayed on the first liquid crystal display-device 3 and the second liquid crystal display-device 4, according to an image control program stored in advance in the program ROM, based on parameters set in the CPU 51. Furthermore, the VDP forms images according to display contents determined by the image control CPU, and outputs these to the first liquid crystal display-device 3 and the second liquid crystal display-device 4.

In this way, for example, in standby states, demonstration screens formed of optional PV music, advertisements, ranking lists, and the like, are displayed, and after a coin has been inserted in the coin insertion slot 9, the song selection screen 15 (see FIG. 2) is displayed on the first liquid crystal display-device 3. When a typing game is begun on the typing game machine 1, the lyrics data included in the music data is displayed one phrase at a time on the first liquid crystal display-device 3, and based on an input result from the keyboard 6, control is performed to compare the character string 23A that the player has already typed, with a character string 23B before typing, and move it lower down. In addition, the PV, that is the video data included in the music data, is displayed on the second liquid crystal display-device 4. In particular, with the independent image area 101 arranged in the upper central region of the main game screen 21 on the first liquid crystal display-device 4, the PV is displayed with the same timing in the independent image area 101 and on the second liquid crystal display-device 4.

A sound control circuit 61 is connected to the CPU 51 via the I/O 52, and is also connected to the speakers 8. When the typing game is executed, the music data stored in the music data storage area 56 of the HDD 55 is read, and the performance data and the sound data included in the music data are converted into sound signals by the sound control circuit 61, and output by the speakers 8.

The illumination control circuit 62 is connected to the CPU 51 via the I/O 52, and is also connected to the illumination devices 7 and to the full color LEDs 155 (see FIG. 7) disposed inside the keys. When the music data stored in the music data storage area 56 of the HDD 55 is read by the CPU 51, the illumination control circuit 62 controls the light emitting mode of the full color LEDs 155, based on the keyboard illumination pattern data included in the music data, and also controls the illumination mode of the illumination devices 7 based on, in addition to the illumination device illumination pattern data included in the music data, the typing game execution program (see FIG. 13), and the like, described below.

Figure 16:
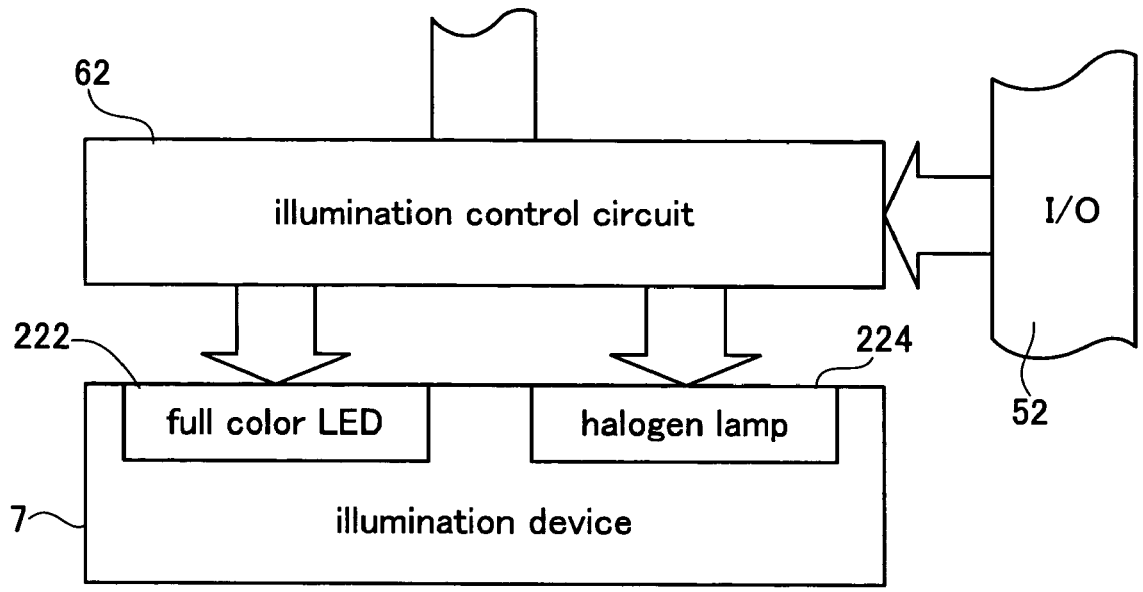
FIG. 16 is a block diagram schematically showing part of a control system for the typing game machine that is provided with and that uses the illumination devices related to the present embodiment.

As shown in FIG. 16, the illumination control circuit 62 is connected not only to the full color LEDs 222 in the illumination devices 7, but also to the halogen lamps 224. Accordingly, in the illumination device illumination pattern data included in the music data, in order to highlight the light emitting mode of the full color LEDs 222, contents for controlling the light emitting mode of the halogen lamps 224 are added. However, the contents for controlling the light emitting mode of the halogen lamps 224 may be arranged separately from the illumination device illumination pattern data. Furthermore, FIG. 16 is a block diagram schematically showing part of the control system for the typing game machine that is provided with and that uses the illumination devices related to the present embodiment.

Returning to FIG. 9, the keyboard 6 is connected to the CPU 51. The key switch 159 arranged inside each key of the keyboard 6 transmits the fact that the key top 153 has been pressed, as an electrical signal flowing in the switch circuit board 151. The CPU 51 performs control to execute various types of operation corresponding to the various keys, based on switch signals output from the various key switches 159, by pressing the various keys.

The coin sensor 63 is a sensor for detecting coins (for example, a one-hundred yen coin) used as value for executing typing games in the typing game machine 1. The coin sensor 63 is disposed inside the coin insertion slot 9, and is connected to the CPU 51 via the I/O 52. Therefore, on the basis of a coin inserted in the coin insertion slot 9, the coin sensor 63 transmits a coin insertion signal to the CPU 51. On detecting a coin insertion signal corresponding to a prescribed amount of money (for example, 200 yen), the CPU 51 enables execution of the typing game.

Furthermore, the card sensor 64 is a senor for detecting whether or not an IC card is inserted in the card insertion slot 10, and the card reader/writer 65 is a device for performing reading and writing of data with respect to the IC tag disposed in the IC card. The card sensor 64 and the card reader/writer 65 are both disposed inside the card insertion slot 10, and are connected to the CPU 51 via the I/O 52. In cases in which an IC card is detected by the card sensor 64 and a prescribed operation is performed, a game result of the typing game is read from the IC tag by the card reader/writer 65 (step S3 in FIG. 11). In addition, when a typing game is completed, writing of new game results (obtained score and points) to the IC tag is carried out (step S9 in FIG. 11).

Furthermore, a spotlight control circuit 211 is connected to the CPU 51, via the I/O 52, and is connected to the spotlights 212. The spotlight control circuit 211 controls the light emitting mode of the spotlights 212, based on a command of the CPU 51, and in particular, when the light emitting mode of the illumination devices 7 is controlled by the abovementioned illumination control circuit 62, by making the spotlights 212 emit light while turning, the illumination presentation of the illumination devices 7 is made ostentatious. Accordingly, in the illumination device illumination pattern data included in the music data stored in the music data storage area 56 of the HDD 55, in order to make the illumination presentation on the illumination devices 7 ostentatious, contents are added to control the light emitting mode of the spotlights 212. However, the contents for controlling the light emitting mode of the spotlights 212 may also be arranged separately from the illumination device illumination pattern data.

Figure 12:
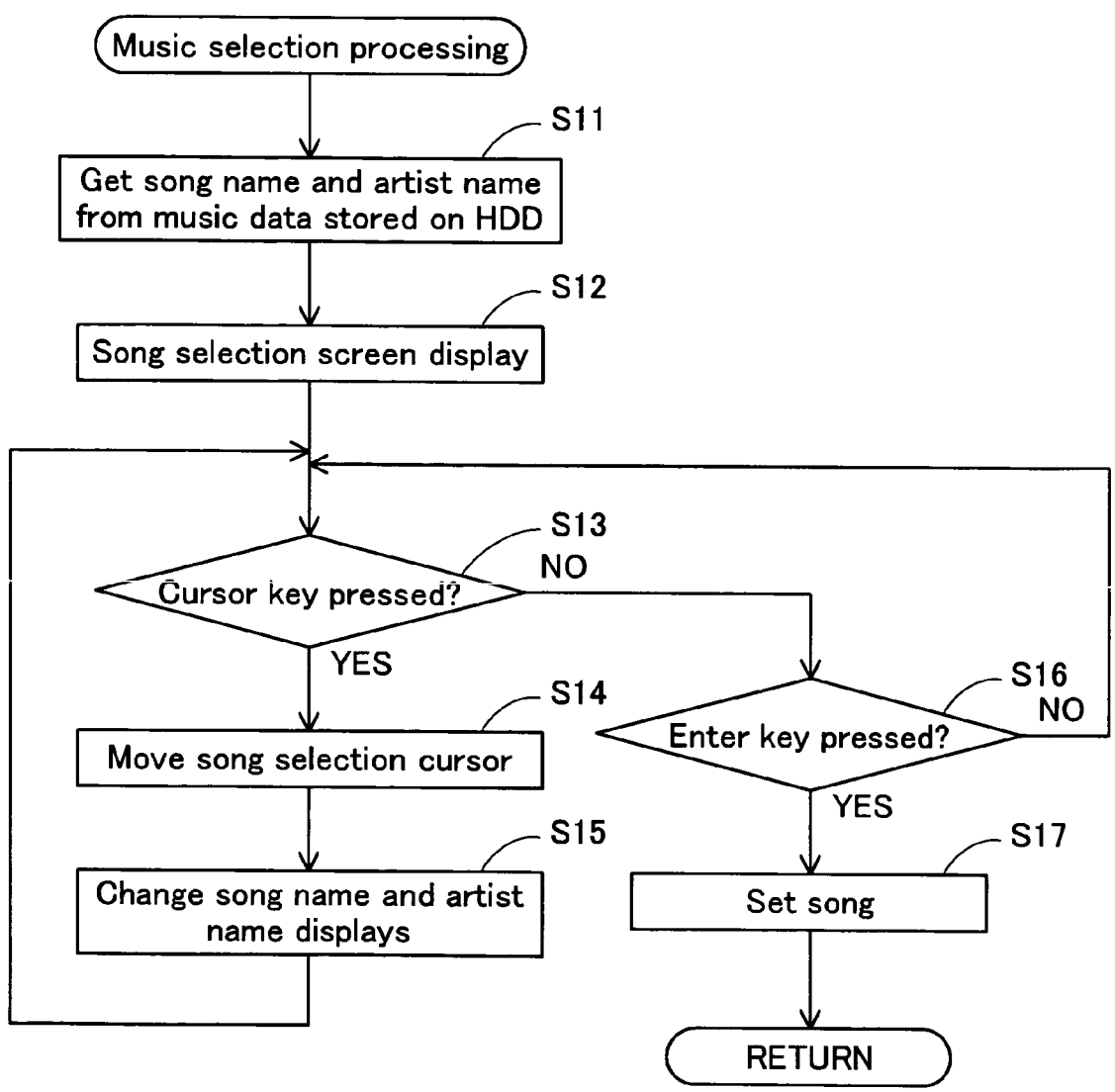
FIG. 12 is a flowchart for a music selection program of the typing game machine that is provided with and that uses the illumination devices related to the present embodiment.
Figure 13:
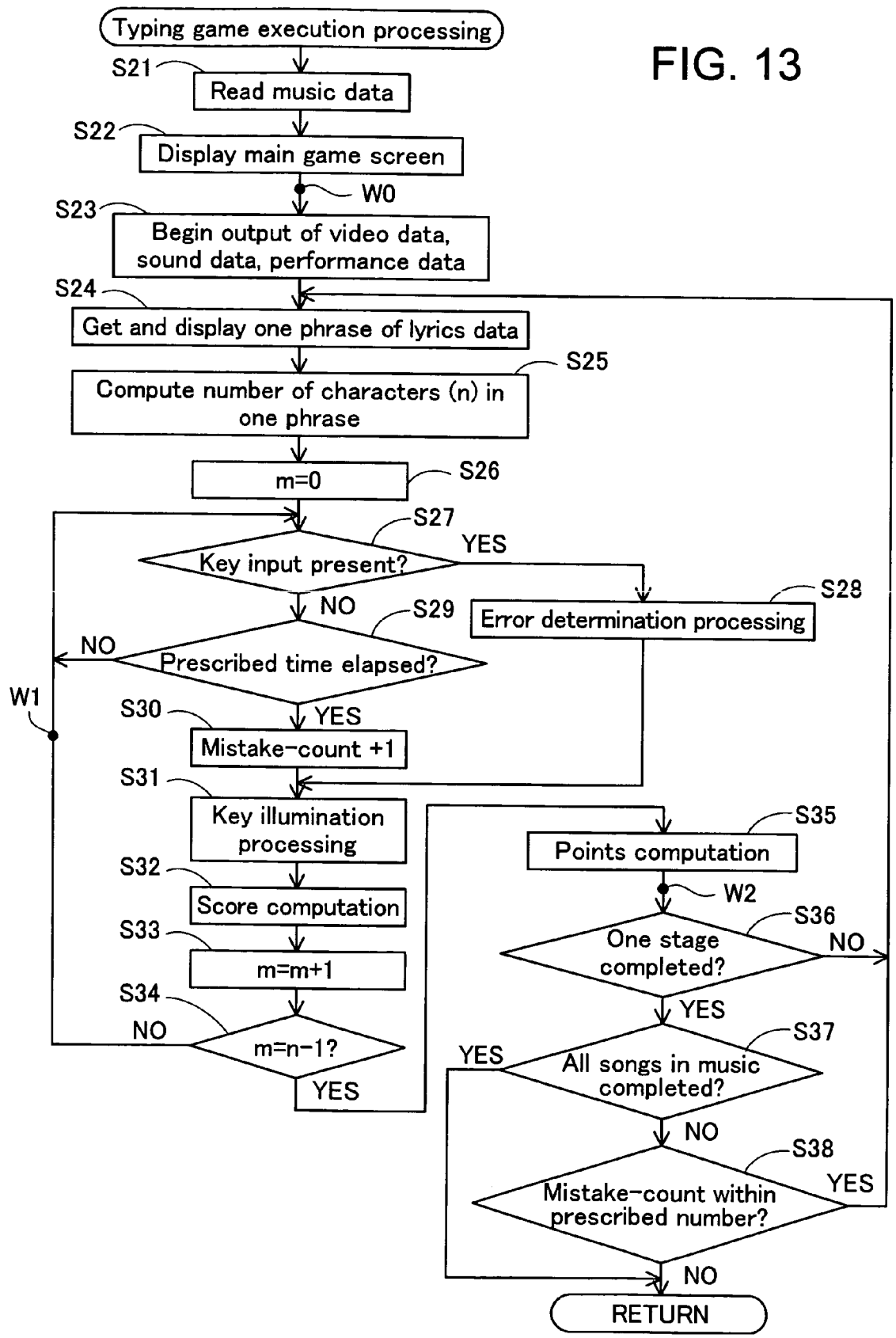
FIG. 13 is a flowchart for a typing game execution program of the typing game machine that is provided with and that uses the illumination devices related to the present embodiment.

Next, a main program run in the typing game machine 1 having the abovementioned configuration is explained, in accordance with FIG. 11. FIG. 11 is a flow chart for the main program of the typing game machine 1 that is provided with and that uses the illumination devices related to the present embodiment. Furthermore, in the following, each program shown in the flowcharts in FIGS. 11 through 13 is stored in the ROM 53 or the RAM 54, provided in the typing game machine 1, and is executed by the CPU 51.

As shown in FIG. 11, first, in step Si, based on a detection signal from the card sensor 64, the CPU 51 judges whether or not an IC card is inserted in the card insertion slot 10. In cases in which it is judged that the IC card is inserted (step S1: YES), additionally, in step S2, a determination is made as to whether or not a request for validation of data contents has been received from the player. On the other hand, in cases in which it is judged that an IC card is not inserted (step S1: NO), control moves to step S4.

Here, in the typing game machine 1 that is provided with and that uses the illumination devices 7 related to the present embodiment, in a state before a coin is inserted and when an IC card owned by the player has been inserted in the card insertion slot 10, when the shift key 113 on the keyboard 6 is pressed, a list of game results stored on the IC card (the score, the points, and the like, obtained by the player up to the previous game) is displayed on the first liquid crystal display-device 3, and the player can confirm the contents thereof.

Accordingly, at step S2, a determination is made as to whether or not the shift key 113 has been pressed, based on an operation signal from the keyboard 6, and in cases in which it is judged that the shift key 113 has been pressed (step S2: YES), data from the IC tag built into the IC card is read by the card reader/writer 65, and based on this read data, the list of game results is displayed on the first liquid crystal display-device 3 (step S3).

Furthermore, in step S4 start-processing is performed. Specifically, in the start-processing, a determination is made as to whether or not a coin (a one-hundred yen coin or the like) of the prescribed monetary value (two hundred yen in the present embodiment) has been inserted in the coin insertion slot 9, and in a standby state while waiting for the insertion, a demonstration screen, or the like, composed of a game screen with demonstration play, an optional music PV, an advertisement, a data ranking list, or the like, is displayed on a display-device. Furthermore, in the typing game machine 1 that is provided with and that uses the illumination devices 7 related to the present embodiment, when a coin is inserted in the coin insertion slot 9, a detection is made by the coin sensor 63, and a coin detection signal is output to the CPU 51. In this way, the CPU 51 can judge whether the player has inserted the coin.

Next, in step S5, the music selection processing of FIG. 12 is performed. In the music selection processing, based on types of music data stored in the music data storage area 56 of the HDD 55, as described below, the song selection screen 15 (see FIG. 2) is displayed on the first liquid crystal display-device 3, and the music to be used in the current game is set.

In step S6, based on the music set in the abovementioned step S5, processing for executing a typing game as in FIG. 13 is performed. In the typing game execution, as described below, music is performed and also the score points, and the like incremented based on a typing result of the keyboard 6, and this continues until a prescribed completion condition is fulfilled.

After that, when the typing game execution has been completed, game results display processing is carried out (step S7). Specifically, in the game results display processing, based on the results of the typing game in the abovementioned step S6, a game results screen 30 (see FIG. 5) is displayed on the first liquid crystal display-device 3. The number of typing mistakes, the obtained points, and the obtained score for the current typing game, stored in the RAM 54, are respectively displayed in the game results screen 30, and in addition, a name input display area 34 prompting the player of the game to input his or her name is displayed. Furthermore, if keyboard 6 operations are carried out in this state, the characters input in the name input display area 34, based on operation signals, are displayed. In cases in which the obtained score equals or exceeds a prescribed score, ranking data stored in the RAM 54 is updated.

Next, in step S8, based on detection signals from the card sensor 64, the CPU 51 judges whether or not the IC card is inserted in the card insertion slot 10. In cases in which it is judged that the IC card is inserted (step S8: YES), additionally, in step S9, the points obtained and the score obtained in the current typing game, stored in the RAM 54, are respectively written to the IC tag built into the IC card, by the card reader/writer 65. Furthermore, the written data here can be referred to in the data content display processing of the abovementioned step S3.

On the other hand, in cases in which it is judged that the IC card is not inserted (step S8: NO), this processing is ended.

Next, the music selection program of the abovementioned step S5 performed in the typing game machine 1 is explained, in accordance with FIG. 12. FIG. 12 is a flowchart for the music selection program related to the present embodiment.

In the music selection processing, first, in step S11, music song names and artist names (in the present embodiment, a maximum of eight varieties) related to the stored music data are respectively obtained from the music data storage area 56 of the HDD 55.

Based on the music song names and artist names obtained in the abovementioned step S11, the song selection screen 15 (see FIG. 2) is displayed on the first liquid crystal display-device 3 (step S12). In the song selection screen 15, a list of music names obtained is displayed in the playable song name display area 16, and in addition, the music song name and artist name selected by the song selection cursor 17 are respectively displayed in the selected song name display area 18 and the selected artist name display area 19.

Next, in step S13, a determination is made as to whether or not a cursor key 114 has been pressed. Here, the determination as to whether or not the cursor key 114 has been pressed is based on an operation signal transmitted from the keyboard 6, and in cases in which it is judged that the cursor key 114 has been pressed (step S13: YES), based on a cursor key 114 operation (whether the upper, lower, left, or right key has been pressed), the song selection cursor 17 displayed on the first liquid crystal display-device 3 is moved in the direction of the pressed key (step S14).

Additionally, in step S15, the selected song name display area 18 and the selected artist name display area 19 displays are respectively changed to the song name and artist name corresponding to the music newly selected by the song selection cursor 17 moved in the abovementioned step S14. After that, control returns to the determination processing of step S13.

On the other hand, in cases in which it is judged that a cursor key 114 has not been pressed (step S13: NO), then a determination is made in step S16 as to whether or not the enter key 112 has been pressed. In cases in which it is judged that the enter key 112 has been pressed (step S16: YES), the music at which the song selection cursor 17 is presently positioned is set as the music with which the typing game is performed this time (step S17), and the typing game described below is started. On the other hand, in cases in which it is judged that the enter key 112 has not been pressed (step S16: NO), control returns again to the determination processing of step S13.

Next, the typing game execution program of the abovementioned step S6 performed in the typing game machine 1 is explained, in accordance with FIG. 13. FIG. 13 is a flowchart for the typing game execution program that is provided with and that uses the illumination devices related the present embodiment.

In the typing game execution, the CPU 51 first reads, in step S21, from among the music data stored in the various storage areas (see FIG. 10) of the music data storage area 56 of the HDD, the music data corresponding to the music selected in the music selection processing of the abovementioned step S5. In particular, the lyrics data stored in the lyrics data storage area 56D is split up, phrase by phrase, and temporarily stored in the RAM 54.

Next, in step S22, the main game screen 21 (see FIGS. 3B and 4B) is displayed on the first liquid crystal display-device 3. At this time, the independent image area 101 is arranged in the upper central region of the main game screen 21 on the first liquid crystal display-device 3. Furthermore, at this time, a character string is not displayed in the lyrics display area 22 or in the Roman letters display area 23 on the main game screen 21, and the points and score displays in the score display area 27 are "0". In addition, at this time, the PV footage 20 is not displayed in the independent image area 101.

Next, based on the video data stored in the video data storage area 56A in step 23, display of PV footage 20 related to the selected music is started with the same timing on the second liquid crystal display-device 4 and the independent image area 101 on the main game screen 21 on the first liquid crystal display-device 3 (see FIGS. 3A and 4A). In addition, output of music backing based on performance data stored in the performance data storage area 56B, via the speakers 8, and output of sound based on sound data stored in the sound data storage area 56C, are each implemented. In this way, music is performed and, in accompaniment with it, the PV footage 20 is reproduced.

Next, in step S24, one phrase of the lyrics data stored in the RAM 54 is taken, and the corresponding character string is displayed, in accordance with the tempo of the music being performed, in each of the lyrics display area 22 and the Roman letters display area 23 of the main game screen 21. In this way, display of the main game screen 21 is carried out on the first liquid crystal display-device 3 in parallel with the music performance and the display of the PV footage 20 on the second liquid crystal display-device 4 (see FIGS. 3B and 4B).

After that, based on the lyrics data in the obtained one phrase, the number of characters, n, in the one phrase is computed (step S25), and "0" is assigned to a given variable, m, stored in the RAM 54 (step S26). Here, the given variable, m, is a variable used in character-input determination for each character of which the one phrase is formed, and each time determination of input of one character is completed, it is incremented by 1 (step S33). Therefore, in each input determination processing, performed repeatedly in steps S27 to S34 below, when m=t (t greater than or equal to 0, and less than or equal to n−1), input determination is performed for characters from the start of the one phrase to the (t+1)th position.

In step S27, based on an operation signal from the keyboard 6, a determination is made as to whether or not there has been key input by a character input key 111. In cases in which it is judged that there has been key input (step S27: YES), based on the type of key that was pressed and the determination criteria data stored in the determination criteria data storage area 56E, error determination processing is performed for the key used for input (step S28). Specifically, in cases in which the key corresponding to a Roman letter displayed in the Roman letters display area 23 (see FIGS. 3B and 4B) of the main game screen 21 is pressed, the typing is recognized as being correct. In cases in which a key that does not correspond is pressed, the mistake count is incremented by 1. After that, control moves to step S31.

On the other hand, in cases in which it is judged that there has not been key input (step S27: NO), determination as to whether or not a prescribed time (when a character at the start of one phrase is input, measured from after the character string corresponding to the one phrase is displayed on the main game screen 21 (step S24), and when a character other than that is input, from after score computation is performed (step S32)) has passed is made, based on information from the timer 58 (step S29). In cases in which it is judged that the prescribed time has not passed (step 29: NO), control returns to the determination processing of step S27.

In contrast to this, in cases in which it is judged that the prescribed time has passed (step S29: YES), the fact that key input by the player has not been performed causes the mistake count for the current game, stored in the RAM 54, to be incremented by 1 (step S30).

Next, in step S31, illumination processing of keys is performed using the full color LEDs 155 arranged inside the keys of the keyboard 6. Specifically, in the typing game machine 1 that is provided with and that uses the illumination devices 7 related to the present embodiment, in cases in which there has been key input (step S27: YES), and where it is judged that the typing is correct, the character key 111 that was pressed is illuminated with a blue color. Furthermore, in cases in which there has been key input (step S27: YES), and where it is judged that the typing was incorrect, the character key 111 that was pressed is illuminated with a red color, and the correct key that should be typed is illuminated with a green color. Additionally, in cases in which there has been no key input (step S27: NO), the correct key that should be typed is illuminated with a green color.

Furthermore, in step S32, the score computation is performed based on the error determination processing of the abovementioned step S28. In the score computation, in cases in which it is judged that the typing was correct according to a determination by the abovementioned error determination processing, the player's score in the current game, stored in the RAM 54, is incremented, and in cases in which the relevant character is typed with the same timing as the sound in the performed music, the score is further incremented.

After that, in step S33, the variable, m, stored in the RAM 54 is read, incremented by +1, and stored again. Next, in step S34, a determination is made as to whether or not the value of the variable, m, has reached n−1, that is, whether or not input determination has been completed for all characters with respect to each character forming the one phrase.

In cases in which it is judged that the value of the variable, m, has not reached n−1 (step S34: NO), control returns again to step S27, and among each of the characters forming the one phrase, input determination is performed for the character positioned next in sequence.

On the other hand, in cases in which it is judged that the value of the variable, m, has reached n−1 (step S34: YES), input of the characters of the one phrase is complete and points computation is performed in step S35. In the points computation, in cases in which it is judged that input of the n characters forming the one phrase has been completed without a typing mistake (including determination of typing mistakes due to the prescribed time elapsing (step S30)), the points are incremented by 1.

Furthermore, in step S36, a determination is made as to whether or not, among the song numbers (normally, a song is numbered 1 to 3) that form the music, determination has been complete for phrase input for the stage corresponding to one of the song numbers. In cases in which it is judged that input determination for all phrases in one stage has not been completed (step S36: NO), control returns to step S24, the next lyrics phrase is taken from the RAM 54, and a corresponding character string is displayed respectively in the lyrics display area 22 and the Roman letters display area 23 on the main game screen 21.

In contrast to this, in cases in which it is judged that input determination for all phrases in one stage has been completed (step S36: YES), a determination is then made as to whether or not input determinations for phrases at all stages (all music songs) has been completed (step S37).

In cases in which it is judged that all stages have been completed (step S37: YES), irrespective of the points held by the player, this typing game execution is completed, and control moves to the game results display processing of step S7. On the other hand, in cases in which it is judged that all stages have not been completed (step S37: NO), a determination is made as to whether or not the typing mistake count of the player up to now, computed in the abovementioned steps S28 and S30, is within a prescribed number (step S38). Here, in the typing game machine 1 that is provided with and that uses the illumination devices 7 related to the present embodiment, the configuration has stages corresponding to the number of songs in the reproduced music, and at the point in time when one stage is completed, in order to continue to the stage corresponding to the next song number, the typing mistake count from the start of the game must be within the prescribed number (for example, in order to continue to number 2 after playing the portion corresponding to number 1, the typing mistake count must be less than 20, and in order to continue to number 3 after playing the portion corresponding to number 2, it must be less than 35.)

In cases in which it is judged that the typing mistake count of the player computed in the abovementioned steps S28 and S30 is within the prescribed number (step S38: YES), control returns to step S24, the lyrics corresponding to the first phrase of the next song number are taken from the RAM 54, and the corresponding character string is displayed respectively in the lyrics display area 22 and the Roman letters display area 23 on the main game screen 21. Input determination processing is performed in the same way. On the other hand, where it is judged that the typing mistake count of the player is above the prescribed number (step S38: NO), processing for this typing game is completed, and control moves to the game results display processing of step S7.

However, in the typing game execution program shown in FIG. 13, a program for processing a score ring initial state is executed, at an intermediate time W0 when progressing from step S22 to step S23; a program for processing a score ring presentation is executed at an intermediate time W1 when returning from step S34 to step S27; and a program for processing a points ring presentation is executed at an intermediate time W2 when progressing from step S35 to step S36.

Figure 17:
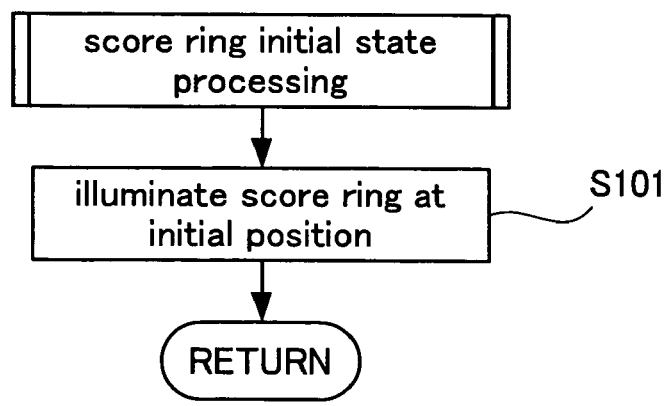
FIG. 17 is a flowchart for a program for processing a score ring initial state in the typing game machine that is provided with and that uses the illumination devices related to the present embodiment.

Given this, first, the program for processing the score ring initial state, executed at the intermediate time W0 when progressing from step S22 to step S23, is explained. FIG. 17 is a flowchart for the program for processing the score ring initial state in the typing game machine that is provided with and that uses the illumination devices related to the present embodiment. That is, at the point in time W0 after executing step S22 of the typing game execution program shown in FIG. 13, when the program for processing the score ring initial state is executed, as shown in FIG. 17, in step S101, a score ring is illuminated at an initial position, and after that, control returns to the typing game execution program shown in FIG. 13, and progresses to step S23.

Figure 22:
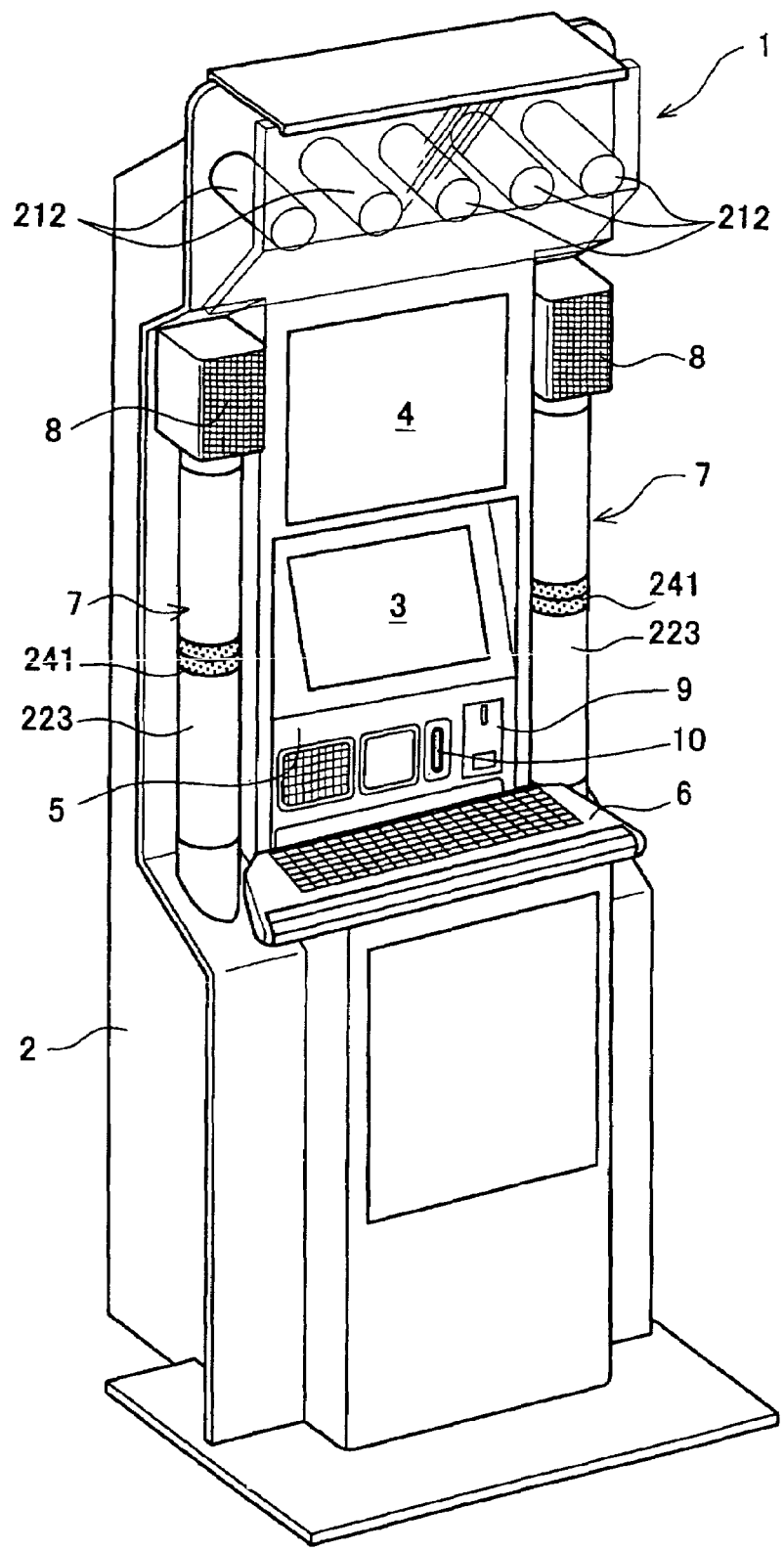
FIG. 22 is a perspective view of the typing game machine provided with and using the illumination devices related to the present embodiment, when a score ring is illuminated at an initial position.

Here, the "illumination of the score ring at the initial position" at step S101 in FIG. 17, in specific terms, involves illuminating, among the twenty-four full color LEDs 222 disposed in a vertical direction in the illumination devices 7, two of the full color LEDs 222 (the twelfth and thirteenth from the top or the bottom) with a gold color, and in this way, as shown in FIG. 22, the score ring 241 that is the abovementioned light emitting ring shape, is displayed with a gold color in the center of the transparent member 223 of each illumination device 7. Furthermore, FIG. 22 is a perspective view of the typing game machine that is provided with and that uses the illumination devices related to the present embodiment, when the score ring is illuminated at the initial position.

Figure 18:
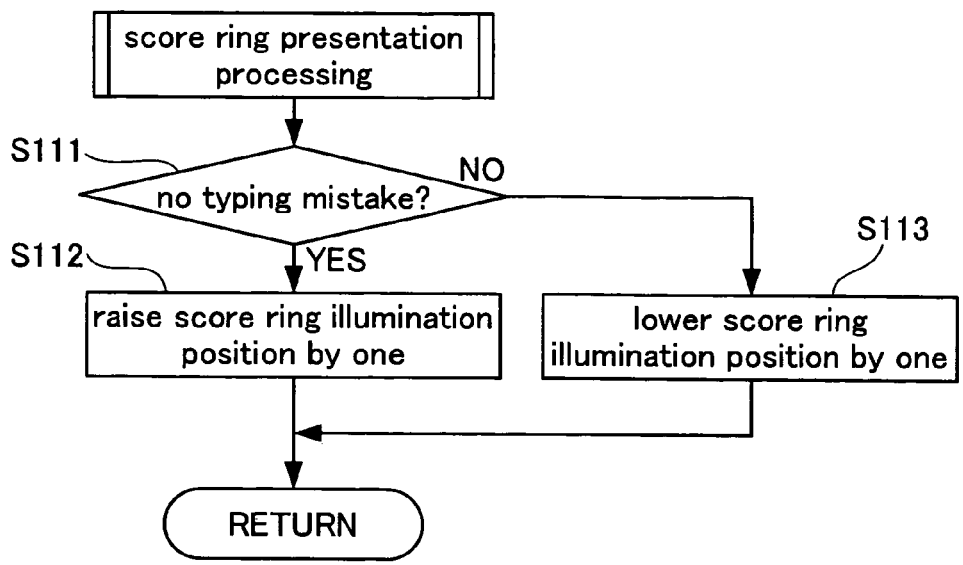
FIG. 18 is a flowchart for a program for processing a score ring presentation in the typing game machine that is provided with and that uses the illumination devices related to the present embodiment.

Next the program for processing the score ring presentation executed at an intermediate time W1 when returning from step S34 to step S27 is explained. FIG. 18 is a flowchart for the program for processing the score ring presentation in the typing game machine that is provided with and that uses the illumination devices related to the present embodiment. That is, at the point in time W1 after executing step S34 of the typing game executing program shown in FIG. 13 (step S34: NO), when the program for processing the score ring presentation is executed, as shown in FIG. 18, first, in step S111, a determination is made as to whether there are mistakes or not. In this regard, "no mistakes" means that the player has made no typing mistakes; more specifically, the number of typing mistakes by the player here has not increased at step S28 and step S30 of the typing game execution program shown in FIG. 13, that is, the player has pressed a key corresponding to a Roman letter displayed in the Roman letter display area 23 (see FIGS. 3B and 4B) in the main game screen 21 within a prescribed time without a mistake, and has succeeded in the typing of one Roman letter.

At this time, in cases in which it is judged that there are no mistakes (step S111: YES), control progresses to step S112, and the score ring illumination is raised one position; on the other hand, in cases in which it is judged that there has been a mistake (step S111: NO), control progresses to step S113, and the score ring illumination is lowered one position; and after this, control returns to the typing game execution program shown in FIG. 13, and returns to step S27.

Figure 23:
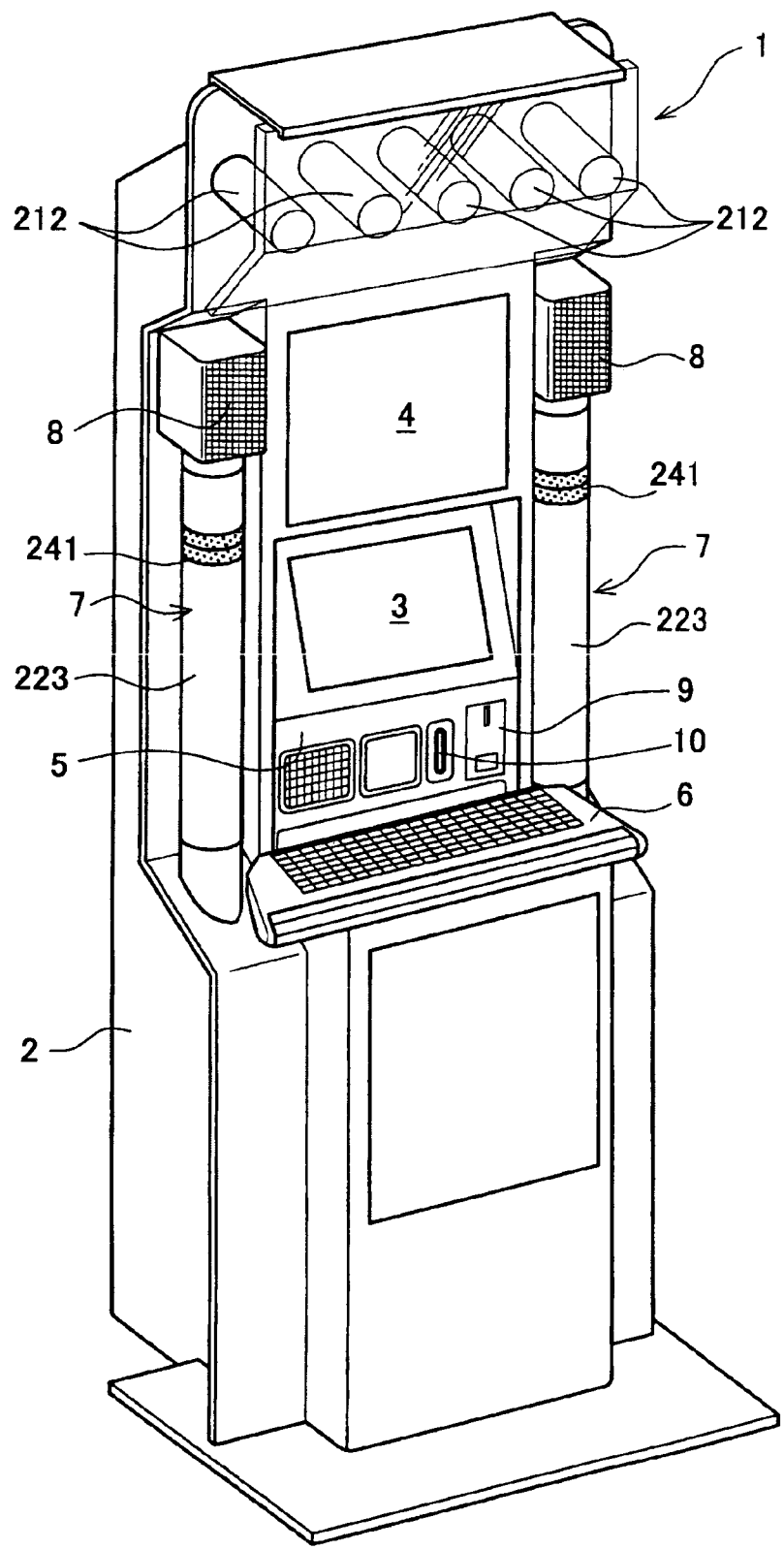
FIG. 23 is a perspective view of the typing game machine provided with and using the illumination devices related to the present embodiment, when the score ring is illuminated at a position raised a few positions from the initial position.

Here, the "raising of the score ring illumination by one position" at step S112 in FIG. 18, in specific terms, means, for example, that when there is currently a score ring 241 at the initial position as shown in FIG. 22, among the twenty-four full color LEDs 222 disposed in a vertical direction in the illumination devices 7, the full color LED 222 that is thirteenth from the top (twelfth from the bottom) is extinguished, and the full color LED 222 that is eleventh from the top (fourteenth from the bottom) is illuminated with the gold color, that is, by illuminating the full color LEDs 222 that are eleventh and twelfth from the top (thirteenth and fourteenth from the bottom) with the gold color, the gold color score ring 241 that is displayed in the transparent member 223 of each illumination device 7 is moved up by one position from the initial position shown in FIG. 22. Accordingly, when there are successive cases in which it is judged that the player has made no typing mistakes (step S111: YES), the gold colored score ring 241 can be displayed rising one position after another in the transparent member 223 of each illumination device 7. However, in cases in which the gold colored score ring 241 rises to the topmost position at the top end of the transparent member 223 of each illumination device 7 and, in addition, it is judged that the player continues to have no typing mistakes (step Sill: YES), the illumination position of the gold color score ring 241 at the topmost position of the transparent member 223 of each illumination device 7 is maintained. Furthermore, FIG. 23 is a perspective view of the typing game machine that is provided with and that uses the illumination devices related to the present embodiment, when the score ring is illuminated after rising a few positions from the initial position.

Figure 24:
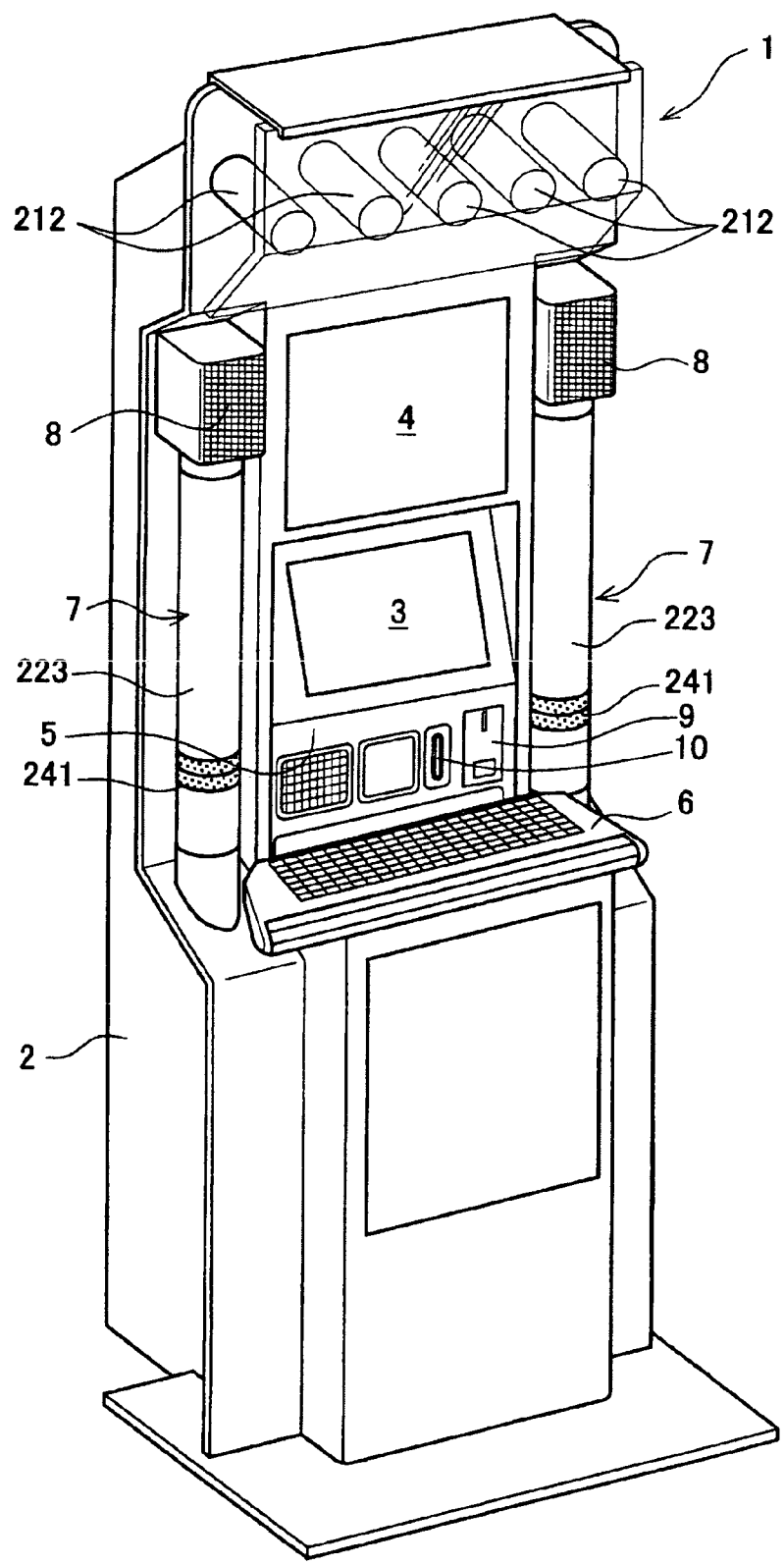
FIG. 24 is a perspective view of the typing game machine provided with and using the illumination devices related to the present embodiment, when the score ring is illuminated at a position lowered a few positions from the initial position.

On the other hand, the "lowering of the score ring illumination by one position" at step S113 in FIG. 18, in specific terms, means, for example, that when there is currently a score ring 241 at the initial position as shown in FIG. 22, among the twenty-four full color LEDs 222 disposed in a vertical direction in the illumination devices 7, the full color LED 222 that is twelfth from the top (thirteenth from the bottom) is extinguished, and the full color LED 222 that is fourteenth from the top (eleventh from the bottom) is illuminated with the gold color, that is, by illuminating the full color LEDs 222 that are thirteenth and fourteenth from the top (eleventh and twelfth from the bottom) with the gold color, the gold color score ring 241 that is displayed in the transparent member 223 of each illumination device 7 is moved down one position from the initial position shown in FIG. 22. Accordingly, when there are successive cases in which it is judged that the player has made a typing mistake (step S111: NO), the gold colored score ring 241 can be displayed descending one position after another in the transparent member 223 of each illumination device 7. In cases in which the gold colored score ring 241 descends to the bottommost position at the bottom end of the transparent member 223 of each illumination device 7, and in addition, it is judged that the player continues to have typing mistakes (step Sill: NO), the illumination position of the gold color score ring 241 at the bottommost position of the transparent member 223 of each illumination device 7 is maintained. Furthermore, FIG. 24 is a perspective view of the typing game machine that is provided with and that uses the illumination devices related to the present embodiment, when the score ring is illuminated at a position after descending a few positions from the initial position.

Figure 19:
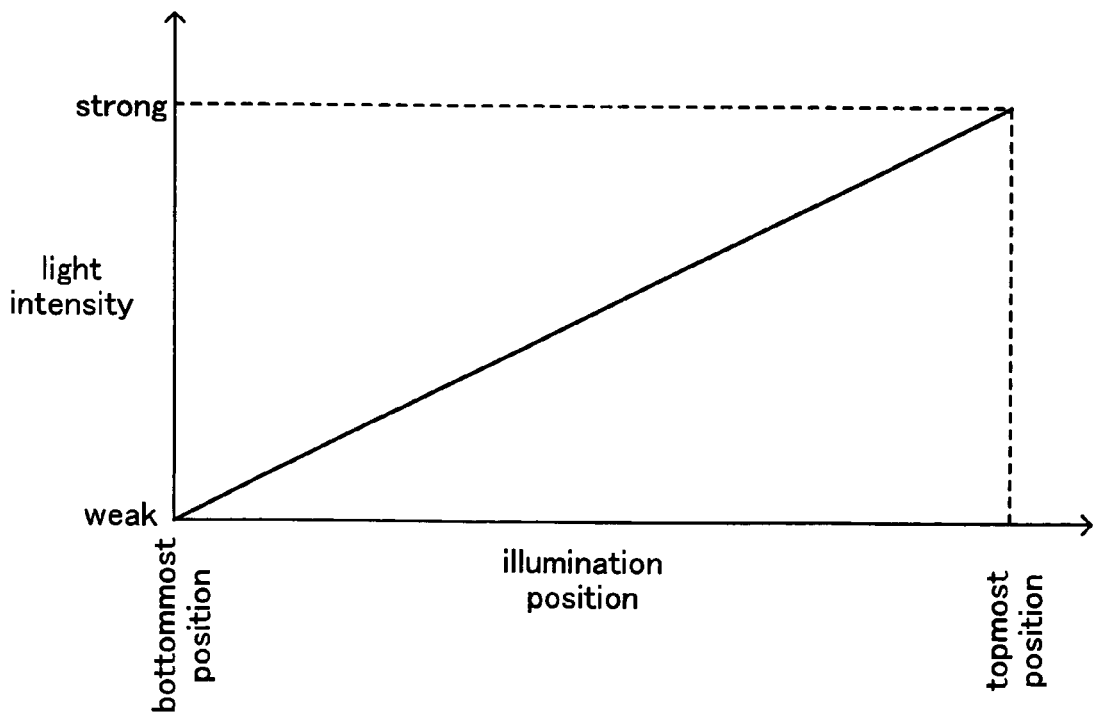
FIG. 19 shows light intensity of a full color LED controlled by a score ring presentation program in the typing game machine that is provided with and that uses the illumination devices related to the present embodiment.

Moreover, the light intensity of the gold colored score ring 241 displayed in the transparent member 223 of each illumination device 7, as shown in FIG. 19, is controlled to give stronger or weaker illumination in proportion to the illumination position in the transparent member 223, being strongest when at the topmost position of the transparent member 223 and being weakest at the bottommost position of the transparent member 223. Accordingly, if the player has more success in typing of single Roman letters, the illumination position of the gold colored score ring 241 displayed in the transparent member 223 of each illumination device 7 moves upward in the transparent member 223, and the light intensity increases; by an illumination presentation with this increased light intensity, a state of the typing game (in particular, related to success in typing single Roman letters) can be made known, and since the attention of observers in the surroundings and of onlookers at a distance can be drawn, the player can become absorbed and get a feeling of accomplishment and satisfaction with the typing game.

In particular, the cylindrical transparent members 223 in the illumination devices 7 are disposed at the two edges of the front face of the cabinet 2, and since the gold colored score ring 241 displayed in the transparent members 233 of the illumination devices 7 can be verified even from a direction fully to the left or the right side, the state of the typing game (particularly, related to success in typing a Roman letter) can be made known even to players playing at a game machine installed next to the typing game machine 1.

In addition, control contents shown in FIG. 19 are stored as a table in the ROM 53; however, they may also be stored in the illumination control circuit 62. Furthermore, the illumination color of the full color LEDs 222 for displaying the score ring 241 with illumination of a particular color may be stored together with the control contents shown in FIG. 19, but may also be stored in the illumination device illumination pattern data storage area 56F in each storage area of the music data storage area 56 formed on the HDD 55. In particular, when stored in the illumination device illumination pattern data storage area 56F, since the illumination color of the full color LEDs 222 can be set for each music data, the score ring 241, for example, can be displayed in a color appropriate to an image of the music that is an object of the typing game.

Figure 20:
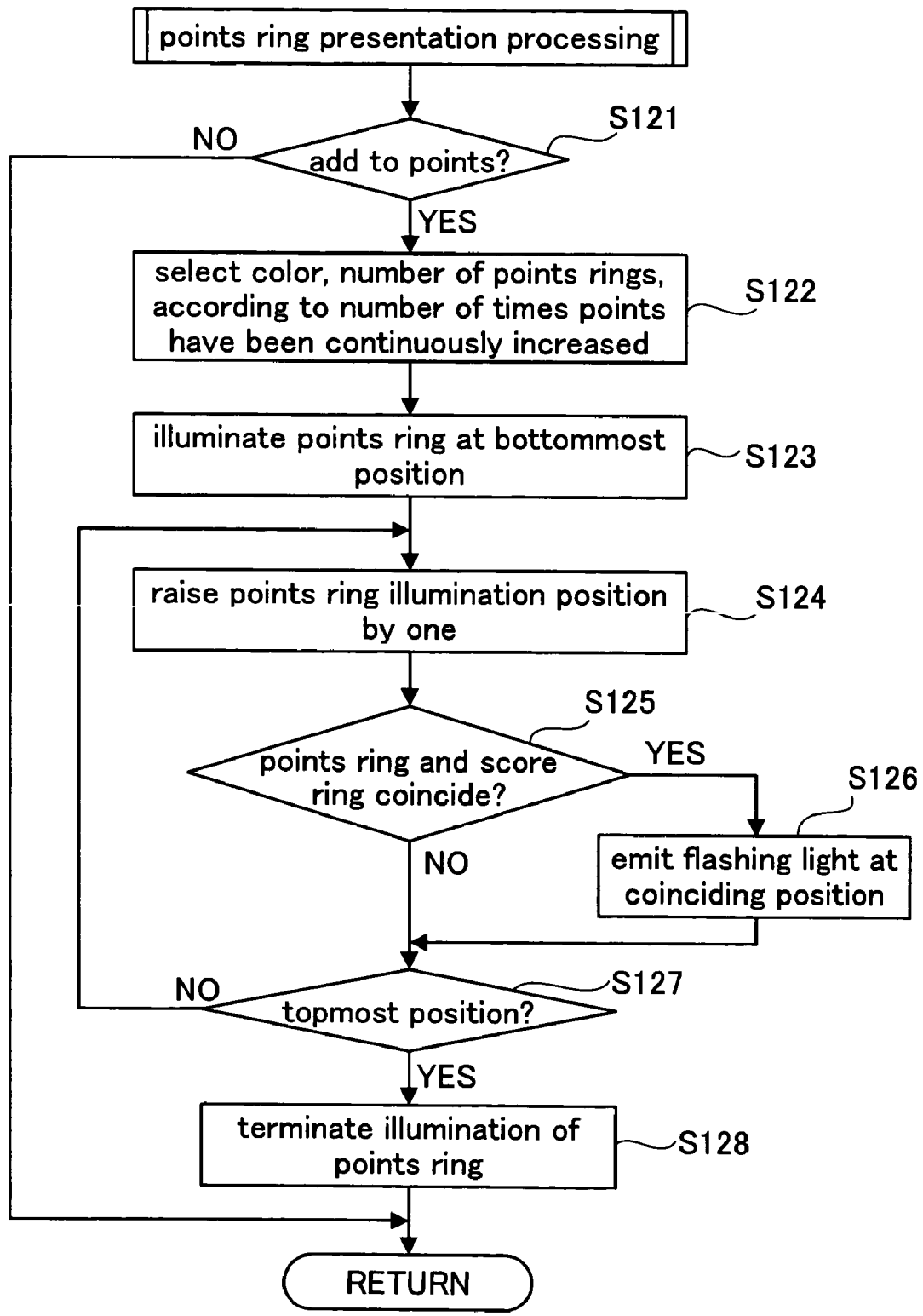
FIG. 20 is a flowchart for a program for processing a points ring presentation in the typing game machine that is provided with and that uses the illumination devices related to the present embodiment.

Next, the program for processing the points ring presentation executed at the intermediate time W2, when progressing from step S35 to step S36, is explained. FIG. 20 is a flowchart for the program for processing the points ring presentation in the typing game machine that is provided with and that uses thee illumination devices related to the present embodiment. That is, at the time W2 after executing step S35 of the typing game execution program shown in FIG. 13, when the program for processing the points ring presentation is executed, as shown in FIG. 20, first, in step S121, a determination is made as to whether or not points have been added. Here, "points have been added" means, in specific terms, that points have been added in step S35 of the typing game execution program shown in FIG. 13, that is, in cases in which the player continues to press a key corresponding to a Roman letter displayed in the Roman letters display area 23 of the main game screen 21 (see FIGS. 3B and 4B) within the prescribed time and without making a mistake, that input of one phrase of a text has been successfully done without making a typing mistake.

At this time, in cases in which it is judged that points have not been added (step S121: NO), without any action being taken, control returns to the typing game execution program shown in FIG. 13, and progresses to step S36.

On the other hand, in cases in which it is judged that points have been added (step S121: YES), control progresses to step S122, and color and number of the points rings are selected in accordance with the number of times that points have been continuously added. Here, "selection of the color and number of points rings in accordance with the number of times that points have been continuously added" means, in specific terms, selecting the color and the number of the points rings based on the number of times that points have been continuously added, according to a control table 231, shown in FIG. 21. Thus, for example, in cases in which one phrase of a text is input without a typing mistake being made, with intermittent success, the number of times that points are continuously added is one, red is selected as the color of the points ring, and one is selected as the number of points rings. Furthermore, for example, in cases of two continuous successes in inputting one phrase of the text without a typing mistake being made, the number of times that points are continuously added is two, blue is selected as the color of the points rings, and two is selected as the number of points rings. Moreover, in cases of three continuous successes in inputting one phrase of the text without a typing mistake being made, the number of times that points are continuously added is three, yellow is selected as the color of the points rings, and three is selected as the number of points rings. In addition, although not described in the control table 231 shown in FIG. 21, in cases of four or more continuous successes in inputting one phrase of the text without a typing mistake being made, the color and number of the points rings are selected to correspond to the continuous number of successes.

Figure 25:
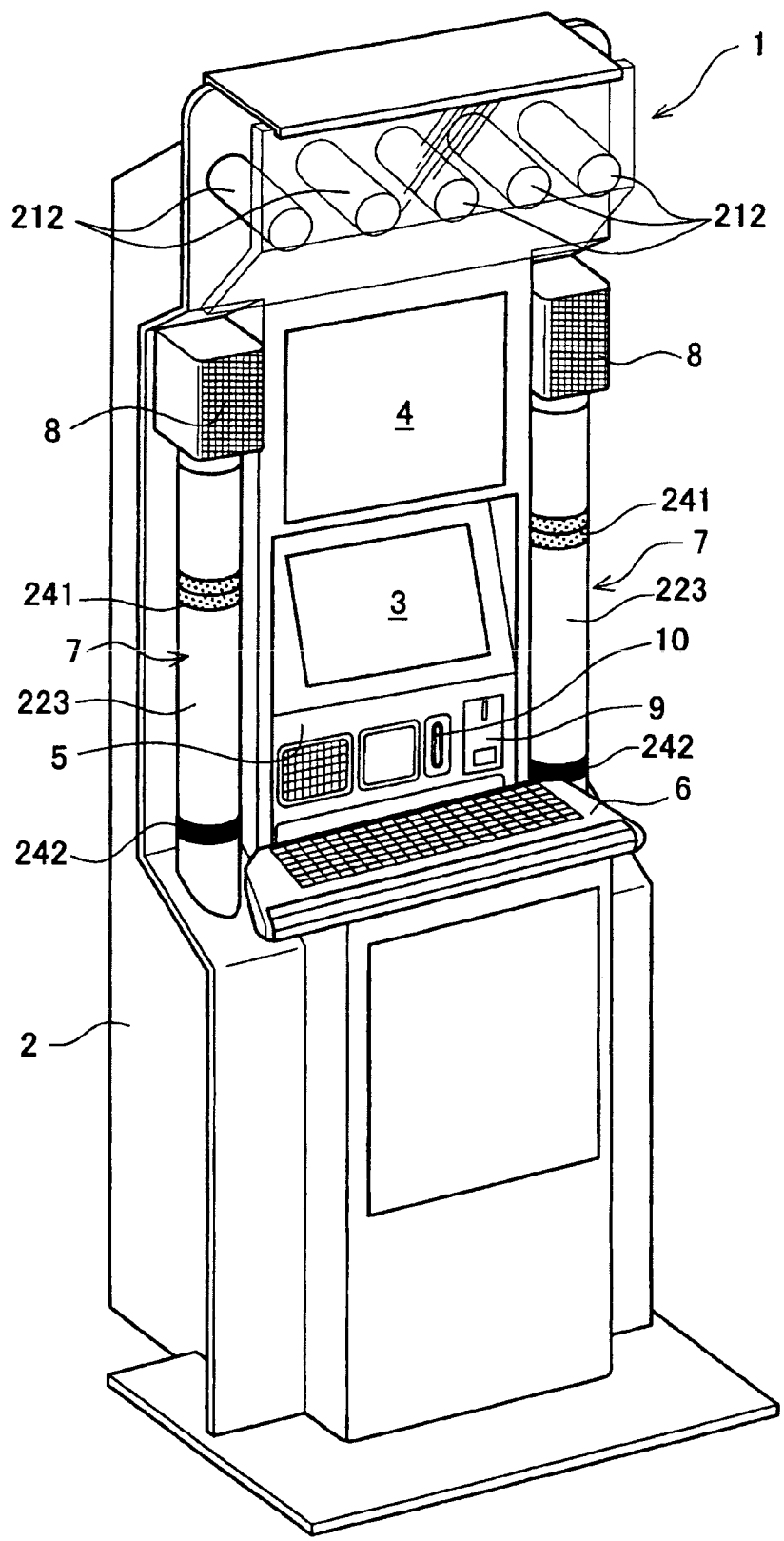
FIG. 25 is a perspective view of the typing game machine provided with and using the illumination devices related to the present embodiment, when the points ring is illuminated at the bottommost position.

After that, control progresses to step S123, and illumination of the points rings at the bottommost positions is performed. Here, "illumination of the points rings at the bottommost positions" means, in specific terms, among the twenty-four full color LEDs 222 disposed in a vertical direction in the illumination devices 7, that the full color LEDs 222, counting from the bottom up to the number of points rings selected in the abovementioned step S122, are illuminated with the color of the points rings selected in the abovementioned step S122. In this way, for example, when the number and color of the points rings selected in the abovementioned step S122 are "one" and "red", among the twenty-four full color LEDs 222 disposed in a vertical direction in the illumination devices 7, the first full color LED 222 counting from the bottom (the twenty-fourth from the top) is illuminated with the red color, and as shown in FIG. 25, one points ring 242, that is the light emitting ring shape described above, can be displayed in a red color, at the bottommost position of the transparent member 223 of each illumination device 7. Furthermore, FIG. 25 is a perspective view of the typing game machine that is provided with and that uses the illumination devices related to the present embodiment, when the points ring is illuminated at the bottommost position.

Furthermore, when the number and color of the points rings selected in the abovementioned step S122 are "two" and "blue", among the twenty-four full color LEDs 222 disposed in a vertical direction in the illumination devices 7, the first and second full color LEDs 222 from the bottom (the twenty-third and twenty-fourth from the top) are illuminated with the blue, color, and, though not shown in the figures, two points rings 242, that form the light emitting ring shapes described above, can be displayed in the blue color, at the bottommost positions of the transparent member 223 of each illumination device 7. In addition, when the number and color of the points rings selected in the abovementioned step S122 are "three" and "yellow", among the twenty-four full color LEDs 222 disposed in a vertical direction in the illumination devices 7, the first, second, and third full color LEDs 222 from the bottom (the twenty-second, twenty-third, and twenty-fourth from the top) are illuminated with the yellow color, and, though not shown in the figures, three points rings 242, that form the light emitting ring shapes described above, can be displayed in the yellow color, at the bottommost positions of the transparent member 223 of each illumination device 7.

After that, control progresses to step S124, and the points ring illumination is raised by one position. Here, "raising of the points ring illumination by one position", in specific terms, means, for example, that when there is currently one points ring 242 with a red color at the bottommost position as shown in FIG. 25, among the twenty-four full color LEDs 222 disposed in a vertical direction in the illumination devices 7, the full color LED 222 that is at the bottom (twenty-fourth from the top) is extinguished, and the full color LED 222 that is second from the bottom (twenty-third from the top) is illuminated with the red color, that is, by illuminating the full color LED 222 that is second from the bottom (twenty-third from the top) with the red color, the red color points ring 242 displayed in the transparent member 223 of each illumination device 7 is moved up one position from the bottommost position shown in FIG. 25.

Furthermore, when there are currently two points rings 242 with the blue color at the bottommost positions (not shown in the figures), among the twenty-four full color LEDs 222 disposed in a vertical direction in the illumination devices 7, the full color LED 222 that is at the bottom (twenty-fourth from the top) is extinguished, and the full color LED 222 that is third from the bottom (twenty-second from the top) is illuminated with the blue color, that is, by illuminating the full color LEDs 222 that are second and third from the bottom (twenty-second and twenty-third from the top) with the blue color, the blue color points rings 242 displayed in the transparent member 223 of each illumination device 7 are moved up one position from the bottommost position. Furthermore, when there are currently three points rings 242 with the yellow color at the bottommost positions (not shown in the figures), among the twenty-four full color LEDs 222 disposed in a vertical direction in the illumination devices 7, the full color LED 222 that is at the bottom (twenty-fourth from the top) is extinguished, and the full color LED 222 that is fourth from the bottom (twenty-first from the top) is illuminated with the yellow color, that is, by illuminating the full color LEDs 222 that are second, third, and fourth from the bottom (twenty-first, twenty-second, and twenty-third from the top) with the yellow color, the yellow color points rings 242 displayed in the transparent member 223 of each illumination device 7 are moved up one position from the bottommost position.

Figure 26:
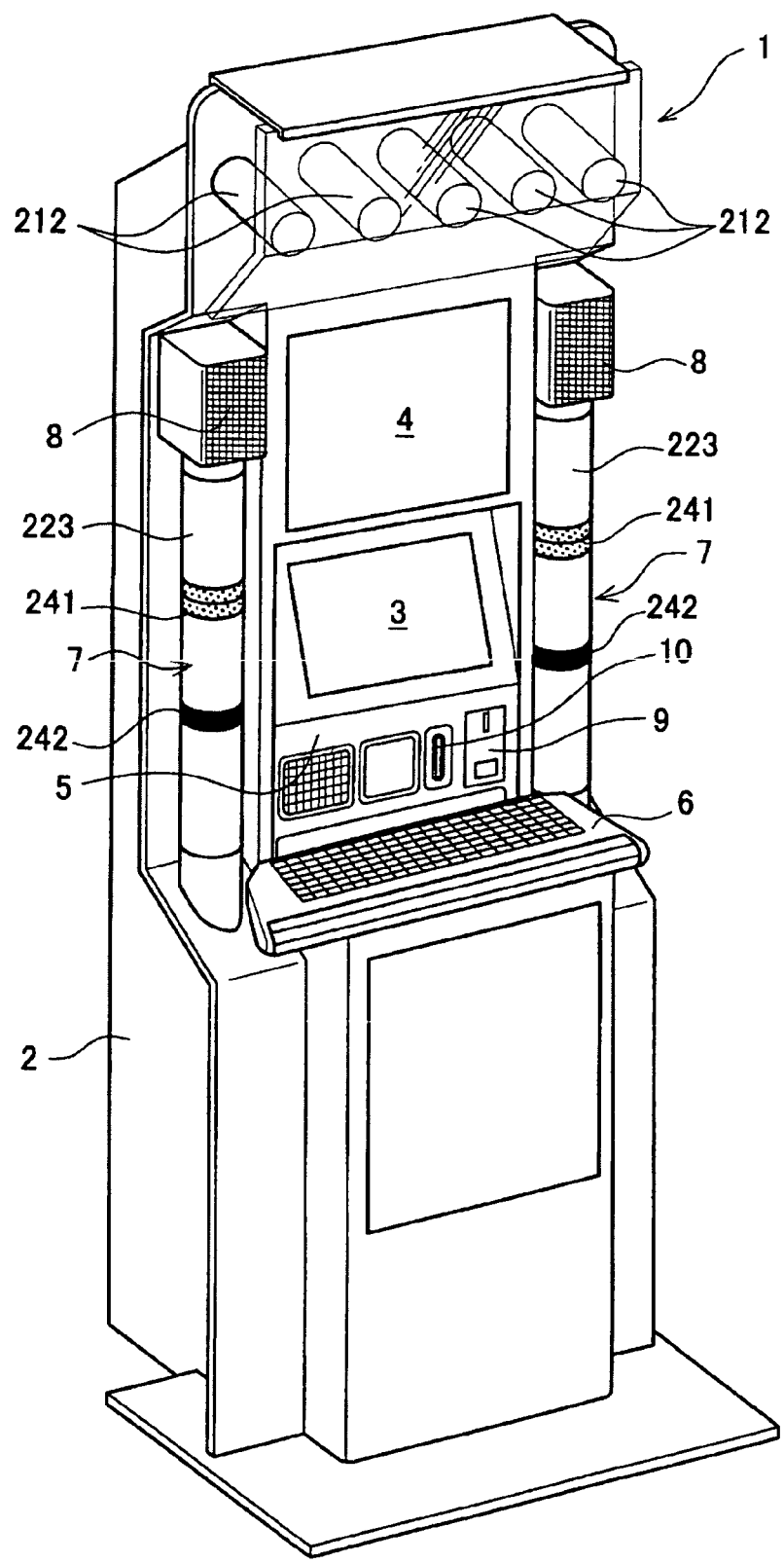
FIG. 26 is a perspective view of the typing game machine provided with and using the illumination devices related to the present embodiment, when the points ring is illuminated at a position raised a few positions from the bottommost position.
Figure 28:
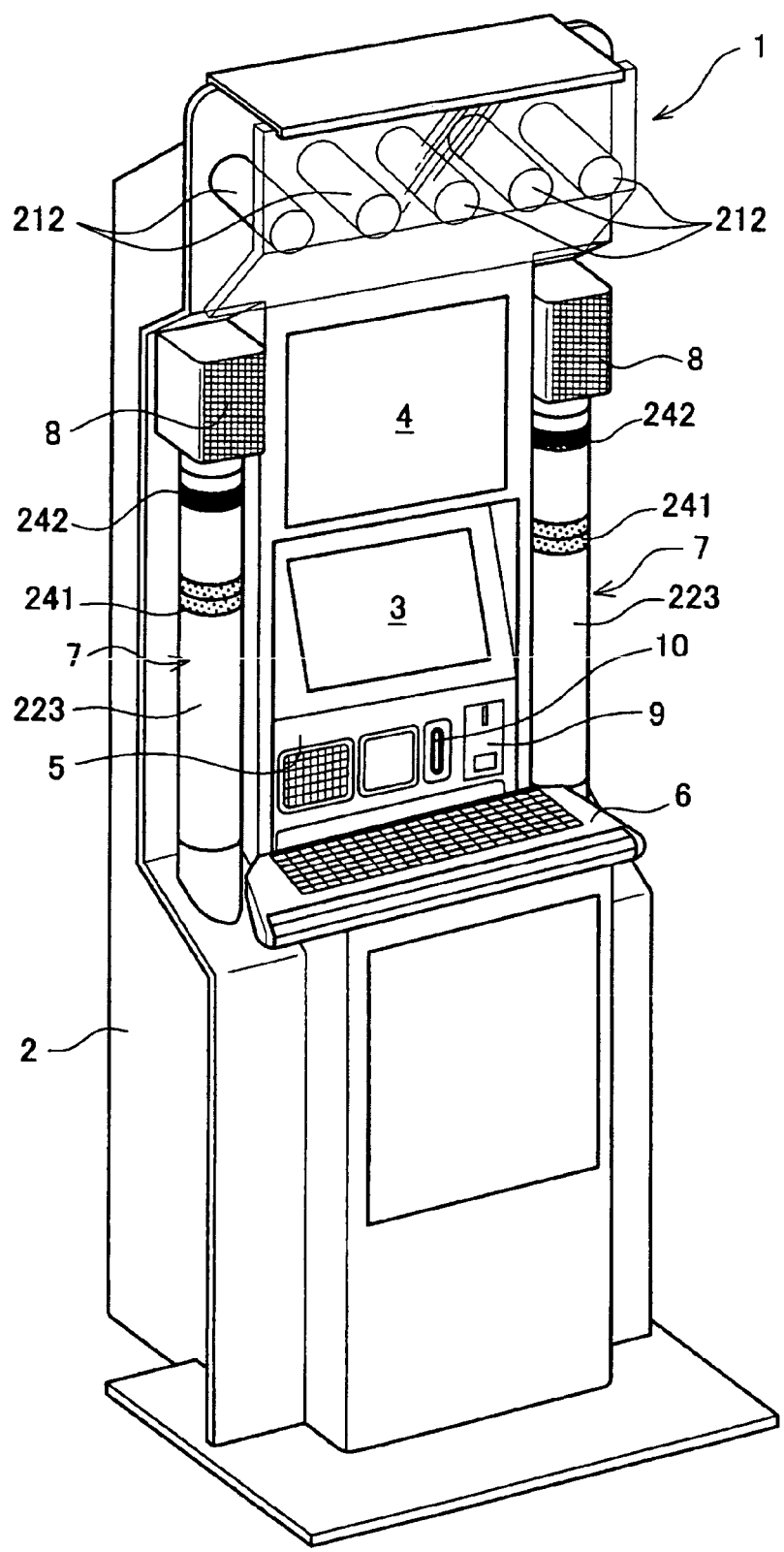
FIG. 28 is a perspective view of the typing game machine provided with and using the illumination devices related to the present embodiment, when the points ring is illuminated at a position a few positions raised from the bottommost position.

Processing of step S124 is repeatedly performed until a determination is made in step S127, described below, that there is a points ring 242 at the topmost position of the transparent member 223 of each illumination device 7 (step S127: YES). As a result, for example, as shown in FIGS. 25, 26, and 28, in that order, one points ring 242 can be displayed rising with a prescribed speed in the transparent member 223 of each illumination device 7. This is the same even if there are two or more points rings 242. Furthermore, FIGS. 26 and 28 are perspective views of the typing game machine that is provided with and that uses the illumination devices related to the present embodiment, when the points ring is illuminated at a position raised a few positions from the bottommost position.

Figure 27:
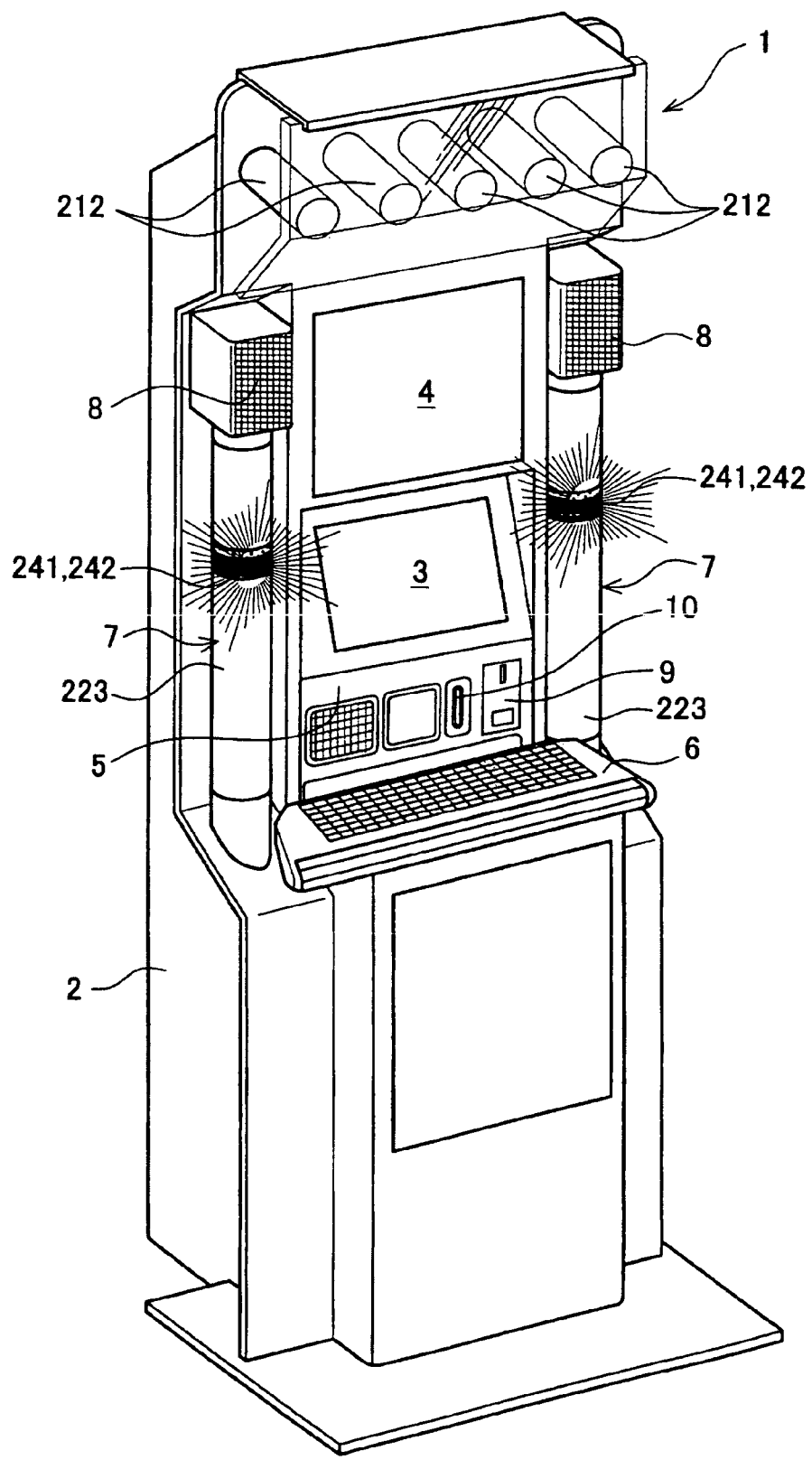
FIG. 27 is a perspective view of the typing game machine provided with and using the illumination devices related to the present embodiment, when the points ring and the score ring, that are mutually overlapping, emit a flash.

Next, when control proceeds from step S124 to step S125, a determination is made as to whether or not the points ring and the score ring coincide. Here, "the points ring and the score ring coincide", in specific terms, means, for example, as shown in FIG. 27, that the points ring 242 and the score ring 241 overlap in the transparent member 223 of each illumination device 7, and that any one of the twenty-four full color LEDs 222 disposed in a vertical direction in the illumination devices 7, is an object of processing of the abovementioned step S123 and, at the same time, is an object of processing of steps S112 and S113 of the score ring presentation processing of FIG. 18, as described above.

At this time, in cases in which it is judged that the points ring and the score ring do not coincide (step S125: NO), without any action being taken, control progresses to step S127; however, in cases in which it is judged that the points ring and the score ring do coincide (step S125: YES), without any action being taken, control progresses to step S126.

In step S126, after emitting flashing light at the coinciding position, control progresses to step S127. Here, "emitting flashing light at the coinciding position", in specific terms, means, for example, as shown in FIG. 27, that when the points ring 242 and the score ring 241 overlap in the transparent member 223 of each illumination device 7, that is, when one of any of the twenty-four full color LEDs 222 disposed in a vertical direction in the illumination devices 7 becomes an object of processing of the abovementioned step S123 and, at the same time, becomes an object of processing of steps S112 and S113 in the score ring presentation processing of FIG. 18, as described above, the full color LED 222 flashes white colored light of strong intensity. In this way, as shown in FIG. 27, the mutually overlapping points ring 242 and the score ring 241 can be displayed to emit flashing light in the transparent member 223 of each illumination device 7.

After that, control progresses to step S127 and a determination is made as to whether or not the points ring is at the topmost position. Here, the "points ring is at the topmost position", in specific terms, means that there is a points ring 242 at the topmost position that is at the top end of the transparent member 223 of each illumination device 7, and among the twenty-four full color LEDs 222 disposed in a vertical direction in the illumination devices 7, in order to display the points ring 242 at the topmost position of the transparent member 223 of each illumination device 7, the topmost (twenty-fourth from the bottom) of the full color LEDs 222 is illuminated. At this time, in cases in which it is judged that the points ring is not at the topmost position (step S127: NO), control returns to the abovementioned step S124, and processing from step S124 onwards is repeated. On the other hand, in cases in which it is judged that the points ring is at the topmost position (step S127: YES), control progresses to step S128.

In step S128, illumination of the points ring is terminated, and after than, control returns to the typing game execution program shown in FIG. 13, and progresses to step S36. Here, "illumination of the points ring is terminated" in step S128 in FIG. 20, in specific terms, means that the points ring 242 at the topmost position of the transparent member 223 of each illumination device 7 is extinguished. Accordingly, for example, in cases in which there is currently one red colored points ring 242 at the topmost position of the transparent member 223 of each illumination device 7, among the twenty-four full color LEDs 222 disposed in a vertical direction in the illumination devices 7, the topmost (twenty-fourth from the bottom) full color LED 222 is extinguished. Furthermore, in cases in which there are currently two blue colored points rings 242 at the topmost positions of the transparent member 223 of each illumination device 7, among the twenty-four full color LEDs 222 disposed in a vertical direction in the illumination devices 7, the first and second full color LEDs 222 from the top (twenty-third and twenty-fourth from the bottom) are extinguished. Furthermore, in cases in which there are currently three yellow colored points rings 242 at the topmost positions of the transparent member 223 of each illumination device 7, among the twenty-four full color LEDs 222 disposed in a vertical direction in the illumination devices 7, the first, second, and third full color LEDs 222 from the top (twenty-second, twenty-third, and twenty-fourth from the bottom) are extinguished. These matters are performed in the same way, even when there are four or more points rings 242.

Accordingly, when the player succeeds in inputting one phrase of a text without making any typing mistakes, the points ring 242 displayed in the transparent member 223 of each illumination device 7, for example, runs through from the bottommost position to the topmost position of the transparent member 223 of each illumination device 7, as shown in FIGS. 25, 26, and 28, in that order, and along the way, if it overlaps with the score ring 241 displayed in the transparent member 223 of each illumination device 7, for example, as shown in FIG. 27, the points ring 242 and the score ring 241 emit a flashing light; by this ostentatious illumination presentation, the state of the typing game (particularly, concerning success in inputting one phrase of the text without making a typing mistake) is made known, and since the attention of observers in the surroundings and onlookers at a distance can be drawn, the player can become absorbed and get a feeling of accomplishment and satisfaction with the typing game.

In addition, when the player has continued successes in inputting one phrase of the text without making any typing mistakes, a number of points rings 242 corresponding to the number of continuous successes is illuminated with a color corresponding to the number of continuous successes (see FIG. 21), so that with the number and color of the points ring 242, the number of continuous successes, in which one phrase of the text is input without a typing mistake, can be made known to observers in the surroundings and onlookers at a distance, and in this way, the player can become even more absorbed and get a feeling of accomplishment and satisfaction with the typing game.

Moreover, in step S126, when the points ring 242 equals or is greater than a prescribed number (for example, ten), if the spotlights 212 installed on the upper part of the cabinet 2 are illuminated while being turned, an even more ostentatious illumination presentation can be made, so that, in this way, the player can make known to observers in the surroundings and to onlookers at a distance, the fact that the number of continuous successes in inputting one phrase of the text without making a typing mistake has reached the prescribed number, that is, the player can make known his or her typing dexterity.

In particular, the cylindrical transparent members 223 in each illumination device 7 are disposed at the two edges of the front face of the cabinet 2, and since the points ring 242 and the score ring 241 that appear in the transparent member 233 of each illumination device 7 can be verified even from a direction fully to the left or the right side, the state of the typing game (particularly, related to success in inputting one phrase of the text without making a typing mistake) can be made known even to players playing at a game machine installed next to the typing game machine 1.

Figure 21:
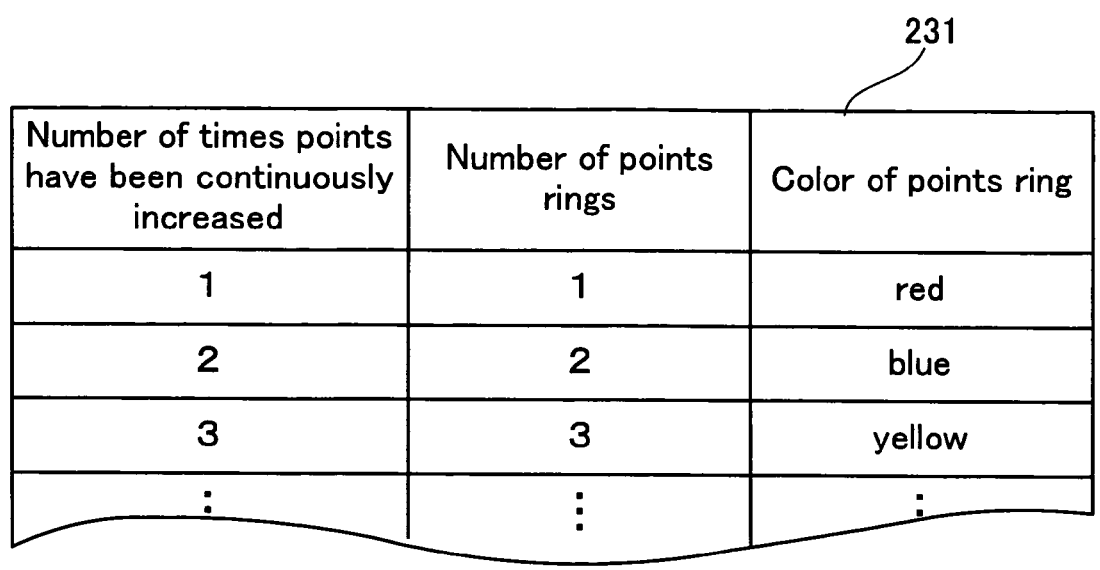
FIG. 21 is a schematic view of a control table used in the program for processing a points ring presentation in the typing game machine that is provided with and that uses the illumination devices related to the present embodiment.

Furthermore, the control table 231 shown in FIG. 21 is stored in the ROM 53, but may also be stored in the illumination control circuit 62. In addition, the lighting mode of the full color LEDs 222 for displaying the points ring 242 (for example, strength or weakness of light intensity, or the like) may be stored together with the control table 231 shown in FIG. 21, but may also be stored in the illumination device illumination pattern data storage area 56F in each storage area of the music data storage area 56 formed on the HDD 55. In particular, when stored in the illumination device illumination pattern data storage area 56F, since the lighting mode (for example, strength or weakness of light intensity, or the like) of the full color LEDs 222 can be set for each piece of music data, the points ring 242 that runs through from the bottommost position to the topmost position of the transparent member 233 in each illumination device 7, for example, can be displayed in a mode that corresponds to the tempo of the music that is the object of the typing game (specifically, for a slow tempo, tranquil and flowing, and for a fast tempo, dazzling light cutting a quick rhythm).

Moreover, the present invention is not limited to the above-mentioned embodiment, and various modifications are possible without departing from the scope of the invention.

For example, in the present embodiment, when the typing game is started, the score ring 241, that is the abovementioned light emitting ring shape, can be displayed at the center of the transparent member 223 of each illumination device 7, and after that, according to whether the typing of one Roman letter is successful or not, the score ring 241 is displayed moving up or down.

This does not imply a limitation concerning the presentation mode of the score ring 241, and, for example, when the typing game is started, the score ring 241 can be displayed at the bottommost position of the transparent member 223 of each illumination device 7, and after that, with a success in typing one Roman letter, the score ring 241 can be displayed moving up, or, conversely, when the typing game is started, the score ring 241 can appear at the topmost position of the transparent member 223 of each illumination device 7, and after that, with a success in typing one Roman letter, the score ring 241 can be displayed moving down.

Furthermore, as a presentation mode of the score ring 241, for example, when the typing game is started, the score ring 241 can be displayed at the bottommost position of the transparent member 223 of one of the illumination devices 7, and after that, with a success in typing one Roman letter, the score ring 241 can be displayed moving up; if the score ring 241 reaches as far as the topmost position of the transparent member 223 of the one of the illumination devices 7, it may move to the topmost position of the transparent member 223 of the other of the illumination devices 7, and the score ring 241 may be displayed moving down.

In addition, in the present embodiment, after starting the typing game, with a success in inputting one phrase of the text without making a typing mistake, the points ring 242 that is displayed in the transparent member 223 of each illumination device 7 runs through from the bottommost position to the topmost position of the transparent member 223 of each illumination device 7, and on the way, if it overlaps with the score ring 241 that is displayed in the transparent member 223 of each illumination device 7, the points ring 242 and the score ring 241 flash.

Here, the presentation mode of the points ring 242 is not limited to the this embodiment, and, for example, when the points ring 242 and the score ring 241 that are displayed in the transparent member 223 of each illumination device 7 overlap, a light emitting ring, separate to the points ring 242 and the score ring 241, may be made to emit a flash.

Furthermore, as a presentation mode of the points ring 242, for example, after the typing game is started, with a success in inputting one phrase of text without making a typing mistake, the points ring 242 that is displayed in the transparent member 223 of each illumination device 7 can run through from the topmost position to the bottommost position of the transparent member 223 of each illumination device 7.

Moreover, for the presentation mode of the score ring 241 and the points ring 242, for example, various patterns for color, number of rings, movement, emission of flashes, and the like, may be stored in the database, and selections may be made to correspond to the image of the music that is the object of the typing game.

In addition, at a prescribed timing immediately after starting and finishing the typing game, by generating plural illumination rings that can be displayed in the transparent member 223 of each illumination device 7, the illumination presentation may be made by the whole of the transparent member 223 in each illumination device 7.

Moreover, in the typing game machine 1 of the present embodiment, the pair of illumination devices 7 are installed with the longitudinal direction of the transparent members 223 thereof arranged vertically. The pair of illumination devices 7 may also be installed with the longitudinal direction of the transparent members 223 thereof arranged horizontally, or diagonally.

The typing game machine 1 has been described in the present embodiment; however, the illumination presentation of the illumination devices 7 may also be applied to a state of a game in other game machines, for card games, mahjong, slot machine games, pachinko, and the like.

Moreover, the illumination devices 7 of the present embodiment are arranged in the typing game machine 1; however, the illumination devices 7 can also be used alone.

The present invention may be applied to an illumination device for performing an illumination presentation, and to control technology for the illumination device for performing the illumination presentation in a game machine.

While preferred embodiments of the present invention have been described and illustrated above, it is to be understood that they are exemplary of the invention and are not to be considered to be limiting. Additions, omissions, substitutions, and other modifications can be made thereto without departing from the spirit or scope of the present invention. Accordingly, the invention is not to be considered to be limited by the foregoing description and is only limited by the scope of the appended claims.

What is claimed is:

1. A gaming machine comprising:
   a cabinet;
   a cylindrical illumination device disposed at a side of the cabinet and including a plurality of light emitting members, wherein the cylindrical illumination device creates a visual illusion of light emitting rings from light emitted by the plurality of light emitting members; and
   a light emission controller for controlling the light emitting members, wherein the light emission controller comprises:
      a first light emission controller that selects at least one of the light emitting members and makes the selected light emitting member emit light in a first light emitting mode in which a light emission position is fixed, according to a current game state;
      a second light emission controller that makes at least another of the light emitting members emit light in a second light emitting mode in which another light emission position moves, when the current game state satisfies a prescribed condition; and
      a third light emission controller that makes at least one of the light emitting members emit light in a third light emitting mode which is different from the first and second emitting modes, when the light emitting member emitting light by the first light emission controller, becomes a light emission object of the second light emission controller,
   wherein the gaming machine performs a typing game, and
   wherein the gaming machine further comprises a storage area for storing music data.

2. A gaming machine according to claim 1, wherein the third light emission controller emits with strong intensity.

3. A gaming machine according to claim 1, wherein the third light emission controller flashes.

4. A gaming machine according to claim 1, wherein
   the first light emission controller determines the current game state, based on an input by a player, and
   the second light emission controller determines the satisfaction of the prescribed condition, based on a predetermined consecutive number of the inputs by the player.

5. The gaming machine according to claim 1, wherein
   the emission by the second light emission controller triggers the emission by the third light emission controller, and
   the second light emission controller controls the light emitting members until the light emission position moves to a predetermined position.

6. The game machine according to claim 1, wherein the illumination device comprises:
   a transparent member in which a lenticular lens of a cylindrical shape is disposed in a longitudinal direction,
   wherein the plurality of light emitting members are disposed in a longitudinal direction at prescribed intervals inside the transparent members, and
   the visual illusion of light emitting rings are respectively arrayed in the longitudinal direction and created by light emitted from the plurality of light emitting members.

7. The game machine according to claim 1, wherein the illumination device further comprises:
   an optical shield for blocking light from the plurality of light emitting members, disposed inside a transparent member, wherein the optical shield restricts an area irradiated by light from the plurality of light emitting members.

8. The game machine according to claim 1, wherein the cabinet is disposed on a side that radiation on an inside of a transparent member is restricted from the light from the plurality of light emitting members.

9. The game machine according to claim 1, wherein the illumination device further comprises an optical shield, wherein the optical shield prevents an area from being irradiated by light from the plurality of light emitting members.

10. The game machine according to claim 4, wherein the second light emission controller determines the satisfaction of the prescribed condition, based on a predetermined consecutive number of correct inputs by the player.

11. The gaming machine according to claim 1, wherein the first light emission controller selects the at least one of the light emitting members and makes the selected light emitting member emit light in a first light emitting mode in which a light emission position, corresponding to a score determined by a score computation device, is fixed, according to a current game state.

12. The gaming machine according to claim 1, wherein the second light emission controller makes the at least another of the light emitting members emit light in a second light emitting mode in which light emission position, corresponding to a point determined by a point computation device is moved, if the current game state satisfies a prescribed condition.

13. The gaming machine according to claim 1, wherein the third light emission controller that makes the at least one of the light emitting members emit light in a third light emitting mode which is different from the first and second emitting modes, if the light emission position corresponding to a score coincides with the other light emission position corresponding to a point.

14. The gaming machine according to claim 1, wherein the music data includes an illumination device illumination pattern data for illuminating the illumination device.

15. The gaming machine according to claim 14, wherein the light emission controller controls the light emitting members based on the illumination device illumination pattern data.

16. The gaming machine according to claim 1,
wherein a transparent member is provided with halogen lamps at a top end and a bottom end thereof, and
wherein the halogen lamps adapted to face each other.

17. The gaming machine according to claim, 14, wherein the illumination device illumination pattern data comprises data for controlling a light emitting mode of a plurality of halogen lamps.

18. The gaming machine according to claim 1, wherein the storage area stores a control table comprising a color data, a number data, and an intensity data, of light emitting from a plurality of light emitting rings.

19. The gaming machine according to claim 18, wherein the control table is stored in an illumination control circuit.

20. The gaming machine according to claim 18, wherein the second light emission controller controls light emitting from one of the plurality of the light emitting rings.

21. The gaming machine according to claim 18, wherein the third light emission controller controls light emitting from one of the plurality of the light emitting rings.

* * * * *